United States Patent [19]
Shibata et al.

[11] Patent Number: 6,120,012
[45] Date of Patent: Sep. 19, 2000

[54] ELECTRONICALLY CONTROLLED ENGINE MOUNT

[75] Inventors: Akira Shibata, Anjo; Hisamitsu Yamazoe, Kariya; Yoshihito Hayashi, Nishikasugai-gun; Kiyonari Honda, Ichinomiya, all of Japan

[73] Assignee: Denso Corporation, Japan

[21] Appl. No.: 08/853,467

[22] Filed: May 9, 1997

[30] Foreign Application Priority Data

| | | | |
|---|---|---|---|
| May 9, 1996 | [JP] | Japan | 8-114986 |
| May 28, 1996 | [JP] | Japan | 8-132478 |
| Jun. 4, 1996 | [JP] | Japan | 8-141300 |
| Sep. 19, 1996 | [JP] | Japan | 8-248354 |
| Feb. 12, 1997 | [JP] | Japan | 9-027442 |

[51] Int. Cl.$^7$ ................................. F16F 13/00
[52] U.S. Cl. ........................ 267/140.14; 267/219
[58] Field of Search ................ 267/140.14, 140.15, 267/140.13, 219

[56] References Cited

U.S. PATENT DOCUMENTS

| | | | |
|---|---|---|---|
| 4,590,564 | 5/1986 | Ishikawa et al. | 364/431.07 |
| 4,650,170 | 3/1987 | Fukushima | 267/140.1 |
| 4,693,455 | 9/1987 | Andrä | 267/140.1 |
| 4,793,599 | 12/1988 | Ishioka | 267/140.1 |
| 4,869,477 | 9/1989 | Hoying et al. | 267/140.1 |
| 5,215,293 | 6/1993 | Muramatsu et al. | 267/140.14 |
| 5,215,294 | 6/1993 | Muramatsu et al. | 267/140.13 |
| 5,267,726 | 12/1993 | Takeo et al. | 267/140.14 |
| 5,287,737 | 2/1994 | Osawa et al. | 73/117.3 |
| 5,333,455 | 8/1994 | Yoshioka | 60/533 |
| 5,439,204 | 8/1995 | Yamazoe et al. | 267/140.14 |

FOREIGN PATENT DOCUMENTS

| | | |
|---|---|---|
| 61-235218 | 10/1986 | Japan . |
| 2-159437 | 6/1990 | Japan . |
| 2-203001 | 8/1990 | Japan . |
| 4-95633 | 3/1992 | Japan . |
| 4-185932 | 7/1992 | Japan . |
| 4-39481 | 9/1992 | Japan . |
| 5-306728 | 11/1993 | Japan . |
| 6-330980 | 11/1994 | Japan . |
| 7-20439 | 4/1995 | Japan . |

*Primary Examiner*—Robert J. Oberleitner
*Assistant Examiner*—Mariano Sy
*Attorney, Agent, or Firm*—Nixon & Vanderhye PC

[57] ABSTRACT

An engine mount which is capable of changing its vibration transmission characteristics with a simple structure using an inexpensive actuator is provided. A partition is inserted to a side member to which a mount rubber (rubber vibration isolator) of the engine mount is spliced to close a space between the mount rubber and to create an air chamber. An air duct pipe which communicates with the air chamber is connected to the side member and is connected to a VSV (vacuum switching valve) via a connection pipe. The VSV is controlled to ON/OFF states based on a driving voltage Vout from an ECU which corresponds to explosive vibrations of the engine to switch pressure within the air chamber to negative pressure of a vacuum tank in which negative pressure of an intake manifold is accumulated or to atmospheric pressure, interlocking with the vibration of the engine. Thereby, the vibration transmission characteristics of the engine mount may be adequately changed and the vehicular vibration may be reduced significantly.

30 Claims, 18 Drawing Sheets

FIG. 4B

FIG. 4D
FIG. 4E ACCEL. VIBRATION g 
FIG. 4F DRIVE VOLT. Vout 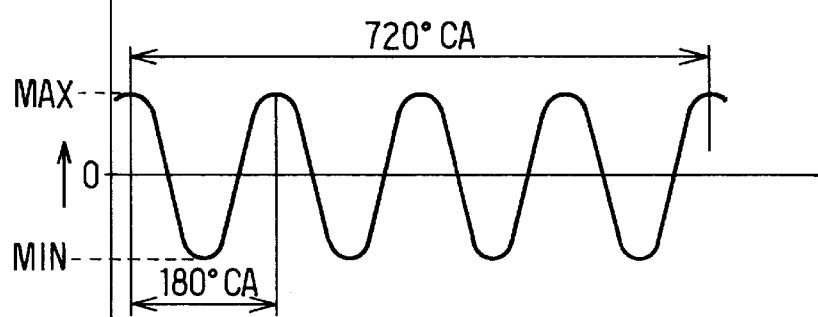
FIG. 4G INDOOR AIR PRES. P 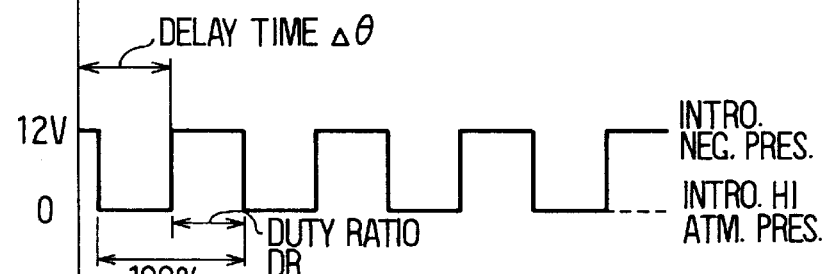

VIBRATION AMPLITUDE
0.1mm —●—
0.2mm —▲—
0.3mm —■—

| N (rpm) | 400 | 450 | 500 | 550 | |
|---|---|---|---|---|---|
| a i | ... | ... | ... | ... | |
| b i | ... | ... | ... | ... | |

| QA (v) | 1.172 | 1.250 | 1.328 | 1.406 | 1.484 |
|---|---|---|---|---|---|
| G (g/sec) | 2.089 | 2.588 | 3.211 | 3.962 | 4.773 |

FIG. 18
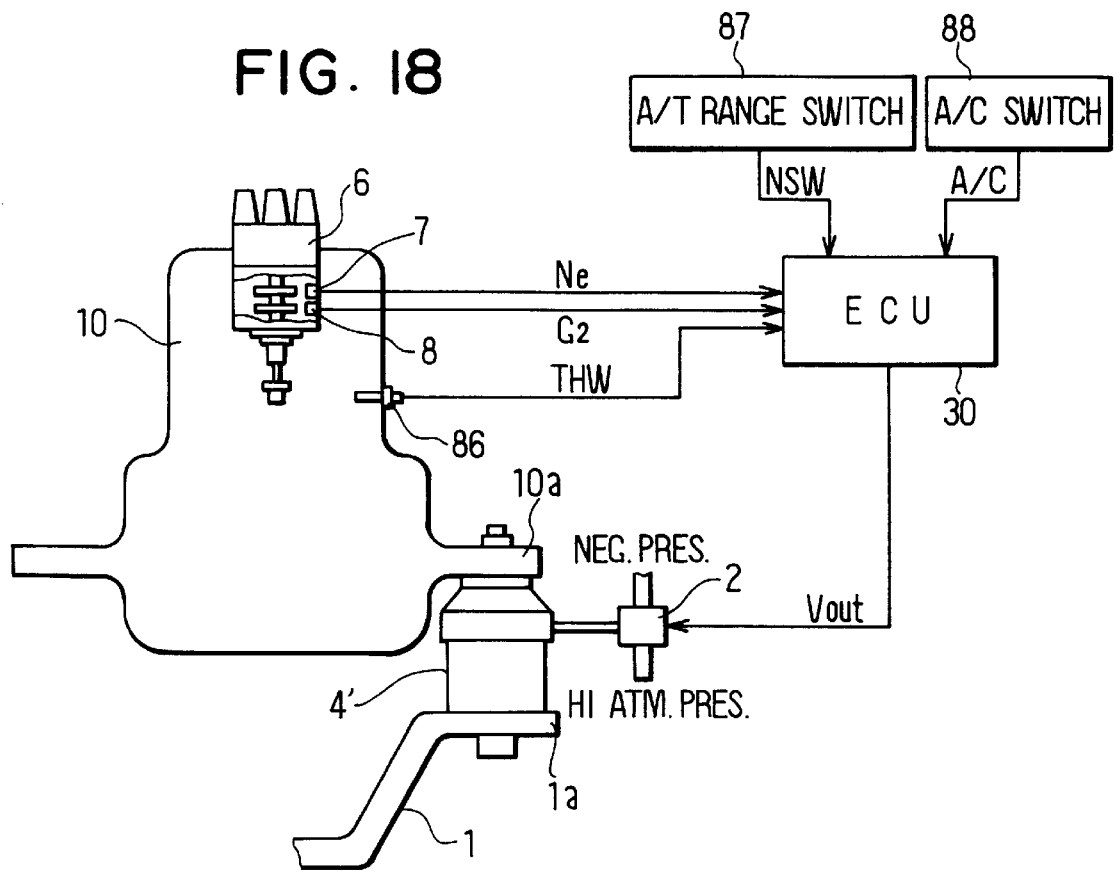
FIG. 21A
|  | A/C ON | A/C OFF |
|---|---|---|
| THW ≤ THWth | CN | CF |
| THW > THWth | HN | HF |
FIG. 21B
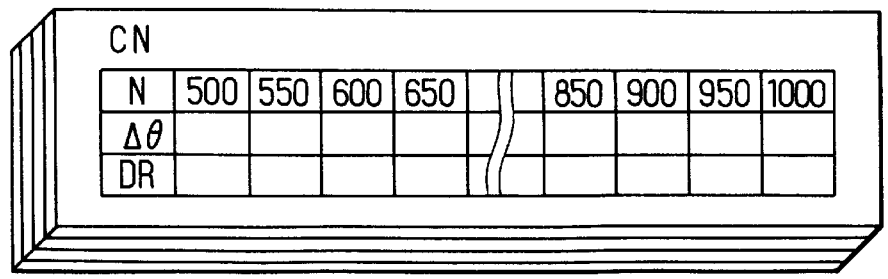

FIG. 24A
| ENG. ROT. SPEED N(rpm) | 650 | | 700 | | 750 | | 800 | | 850 | |
|---|---|---|---|---|---|---|---|---|---|---|
| COOLANT TEMP. COND. | LOW | HIGH | LOW | HIGH | LOW | HIGH | LOW | HIGH | LOW | HIGH |
| PHASE ANGLE Δθ (°CA) | --- | 150 | 156 | 150 | 156 | 150 | 156 | 150 | 156 | --- |
| DUTY RATIO DR (%) | --- | 63 | 50 | 63 | 50 | 63 | 50 | 63 | 50 | --- |
FIG. 24B
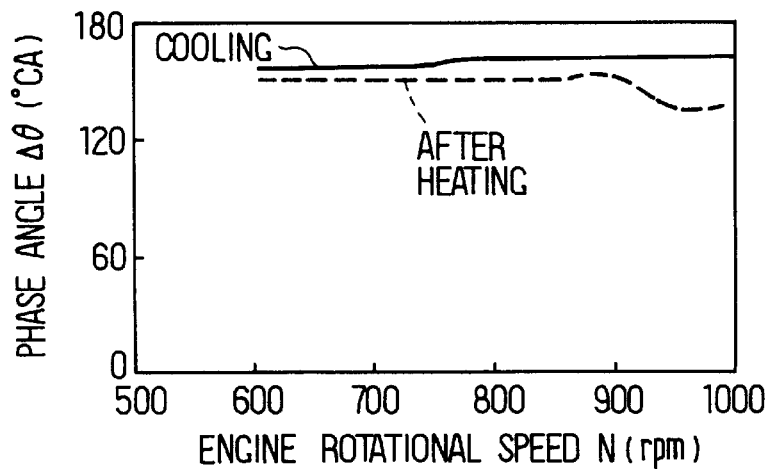
FIG. 24C
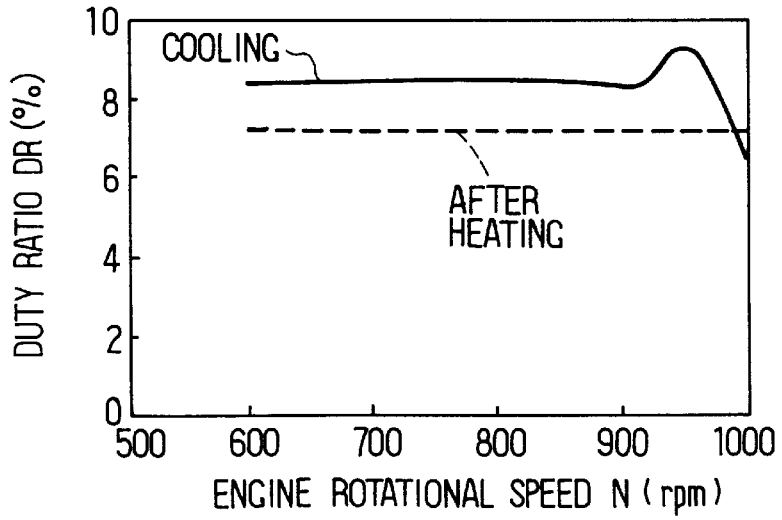

ELECTRONICALLY CONTROLLED ENGINE MOUNT

CROSS-REFERENCE TO RELATED APPLICATIONS

This application is related to Japanese Patent Application Nos. Hei 8-114986, 8-132478, 8-141300, 8-248354, and 9-27442, all of which are incorporated herein by reference.

BACKGROUND OF THE INVENTION

1. Field of the Invention

The present invention relates to an electronically controlled engine mount which is disposed between a body and an engine of a vehicle and which is capable of arbitrarily changing its vibration transmission characteristics in correspondence with a state of vibration of the engine.

2. Description of Related Art

Recently, vibration transmission characteristics (e.g., dynamic spring constant and damping coefficient) of an engine mount has come to be electronically controlled to improve vehicular vibration characteristics. Japanese Utility Model Laid-Open Publication No. 4-39481 and Japanese Patent Application Laid-Open Publication Nos. Hei 4-185932, 5-306728, 6-330980 and 7-20439 disclose such devices.

While an actuator of the electronically controlled engine mount has been constructed using a PZT (piezoresistance element) according to Japanese Patent Application Laid-Open Publication No. 4-185932 and by using a voice coil using a rare-earth magnet recording to Japanese Utility Model Laid-Open Publication No. Hei 4-39481 described above, respectively, those components are expensive and it has been difficult to put them into practical use. Further, according to Japanese Patent Application Laid-Open Publication No. Hei 6-330980, although an actuator of an electronically controlled engine mount has been constructed by using a voice coil having an inexpensive ferrite magnet, its structure is still complicated and it has been expensive, so that it has not been suitable to be put into practical use.

Japanese Patent Application Laid-Open Publication Nos. Hei 5-306728 and 7-20439 disclose a relatively simple and inexpensive electronically controlled engine mount which uses a vacuum actuator and which reduces engine shake and idling vibration corresponding to engine operating conditions. However, because this engine mount is a so-called semi-active type engine mount which just switches vibration transmission characteristics between idling and other driving states, it has had a problem that it is unable to provide a sufficient idling vibration reducing effect.

SUMMARY OF THE INVENTION

Accordingly, it is an object of the present invention to solve the aforementioned problems of the prior art by providing an electronically controlled engine mount which is capable of changing its vibration transmission characteristics and has enhanced durability while using an inexpensive actuator and having a simple structure.

The above object is achieved according to a first aspect of the invention by providing an engine mount in which a partition is inserted to a side member to which a mount rubber (rubber vibration isolator) of the engine mount is spliced to close a space between the mount rubber and to create an air chamber. An air duct pipe which communicates with the air chamber is connected to the side member and is connected with a VSV (vacuum switching valve) via a connection pipe. The VSV is controlled to ON/OFF states based on a driving voltage Vout from an ECU which corresponds to explosive vibration of the engine to switch pressure within the air chamber to negative pressure of a vacuum tank in which negative pressure of an intake manifold is accumulated or to atmospheric pressure, synchronously with the vibration of the engine. Thereby, the vibration transmission characteristics of the engine mount may be adequately changed and the vehicular vibration may be reduced significantly.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 4A–4G are graphs showing each signal waveform of a four-cycle straight four cylinder engine used in the electronically controlled engine mount of the first through third embodiments;

FIG. 18 is a schematic drawing showing a structure around an engine to which an electronically controlled engine mount according to a fifth embodiment of the present invention has been applied;

FIGS. 21A and 21B are maps used in FIG. 20;

FIGS. 24A, and 24B and 24C are a map and graphs, respectively, showing selection of coolant temperature condition, optimal phase angle and voltage with respect to engine rotational speed in the first embodiment.

DETAILED DESCRIPTION OF THE PRESENTLY PREFERRED EXEMPLARY EMBODIMENTS

Figure 1:
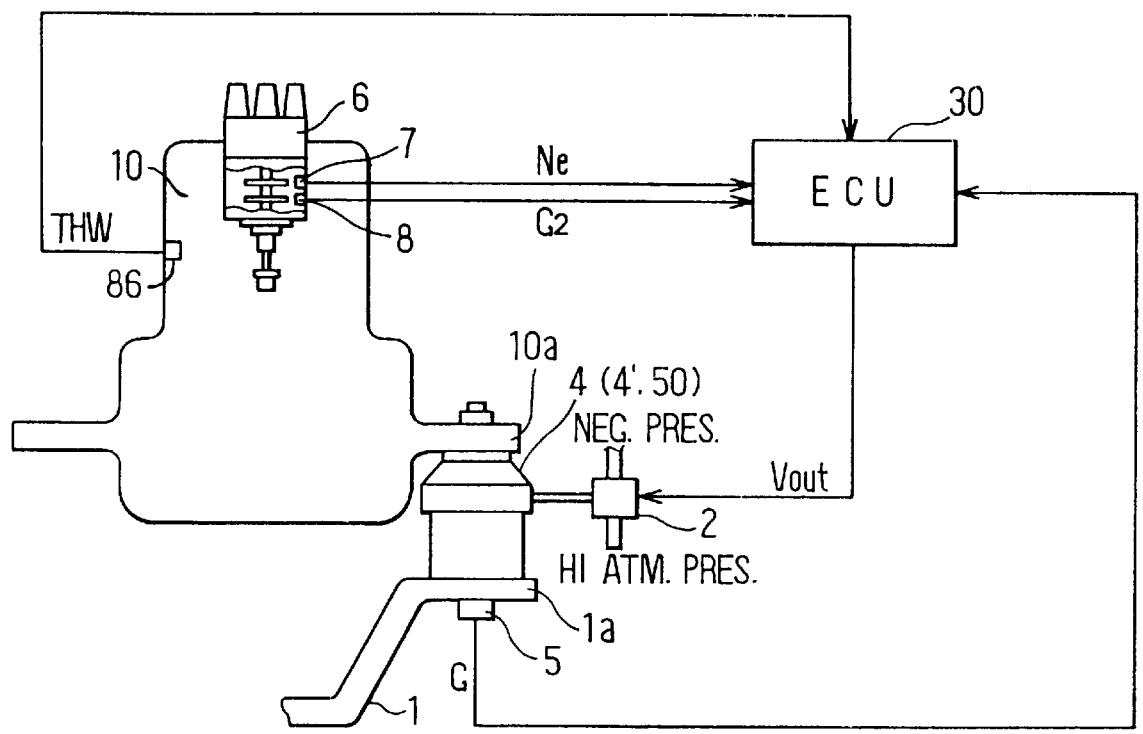
FIG. 1 is a schematic drawing showing a structure around an engine to which an electronically controlled engine mount of first through third preferred embodiments of the present invention is applied.

FIG. 1 is a schematic drawing showing a structure around an engine to which an electronically controlled engine mount of a first embodiment of the present invention has been applied.

In FIG. 1, the electronically controlled engine mount includes an engine mount 4 disposed between a stay 1a of a body 1 and a stay 10a of an engine (internal combustion engine) 10, an ECU (Electronic Control Unit) 30 for controlling the engine mount 4, an acceleration sensor 5, attached on the stay 1a side of the body 1 near the engine mount 4, for outputting an acceleration signal G which corresponds to vibration generated by the body 1, a rotational angle sensor 7, disposed within a distributor 6 of the engine 10, for outputting a rotational angle signal N used to determine the engine speed, a reference position sensor 8 for outputting a reference position signal G2 related to a reference position of a crank angle and a water temperature sensor 86 for detecting temperature of engine cooling water. The rotational angle sensor 7 and the reference position sensor 8 are one type of a magnet pickup. The acceleration signal G from the acceleration sensor 5, the rotational angle signal Ne from the rotational angle sensor 7, the reference position signal G2 from the reference position sensor 8 and a cooling water temperature signal THW from the water temperature sensor 86 are each input to the ECU 30. Driving voltage Vout from the ECU 30 is input to a vacuum switching valve (hereinafter referred to simply as "VSV") 2 as a three-port two-position switching valve which is an inexpensive vacuum actuator connected to the engine mount 4.

The detailed structure of the engine mount 4 and peripheral devices thereof will be explained below with reference to the cross-sectional view of FIG. 2.

Figure 2:
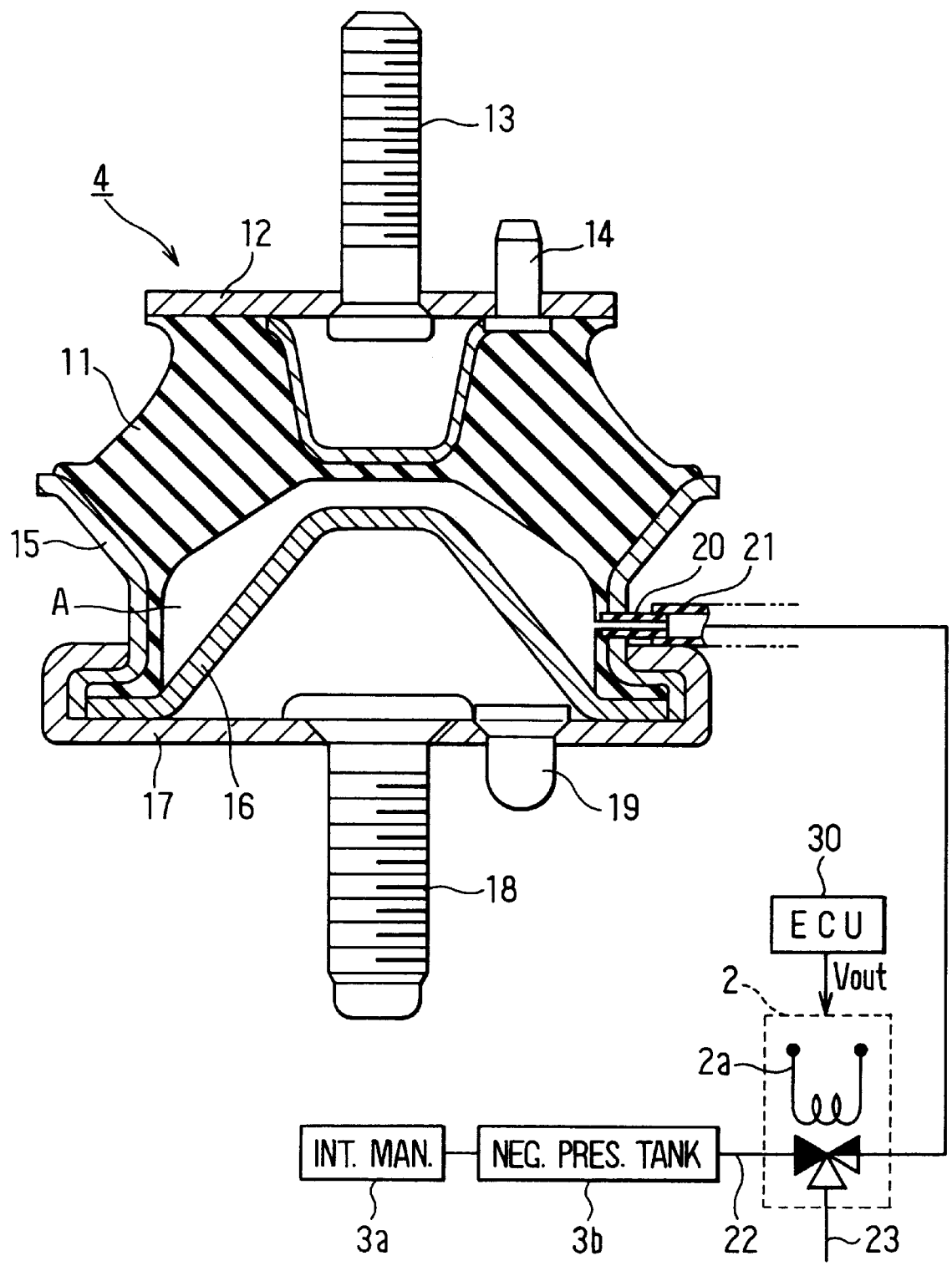
FIG. 2 is a cross-sectional view showing a detailed structure of an engine mount and peripheral devices thereof according to the first preferred embodiment of the present invention.

In FIG. 2, a disk 12 is spliced with an upper end of a mount rubber (rubber vibration isolator) 11 made of a domed thick elastic member which is opened downward of the engine mount 4. A bolt 13 which protrudes upward to place and fix the engine 10 is press-fitted at the center of the disk 12 and a stopper pin 14 for stopping the engine mount 4 from turning with respect to the engine 10 is press-fitted around the bolt 13. A cylinder-like side member 15 is spliced around the lower part of the mount rubber 11 and a convex container-like partition 16 is inserted below the side member 15, closing a space between it and the mount rubber 11 to create an air chamber A.

Then, the side member 15, the lower end of the mount rubber 11 and the circumferential edge of the partition 16 are caulked and fixed at the same time by a bottom member 17. A bolt 18 which protrudes downward to connect and fix the body 1 is press-fitted at the center of the bottom member 17 and a stopper pin 19 for stopping the engine mount 4 from turning with respect to the body work 1 is press-fitted around the bolt 18.

An air duct pipe 20 for connecting the air chamber A closed by the mount rubber 11 and the partition 16 with the outside is linked to the side member 15 penetrating through the mount rubber 11 and the side member 15. One end of a connection pipe 21 is connected to the air duct pipe 20 and the other end of the connection pipe 21 is connected to a common port among three ports of the VSV 2.

The other two ports of the VSV 2 are connected, respectively, to a negative pressure introducing pipe 22 linked to a vacuum tank 3b for storing negative pressure from an intake manifold 3a by a non-return valve (not shown) and an atmospheric air introducing pipe 23 for introducing atmospheric pressure via an air filter (not shown). The VSV 2 is controlled in ON/OFF states as described later based on the driving voltage Vout from the ECU 30 to switch the pressure P within the air chamber A to predetermined negative pressure or to atmospheric pressure.

Figure 3:
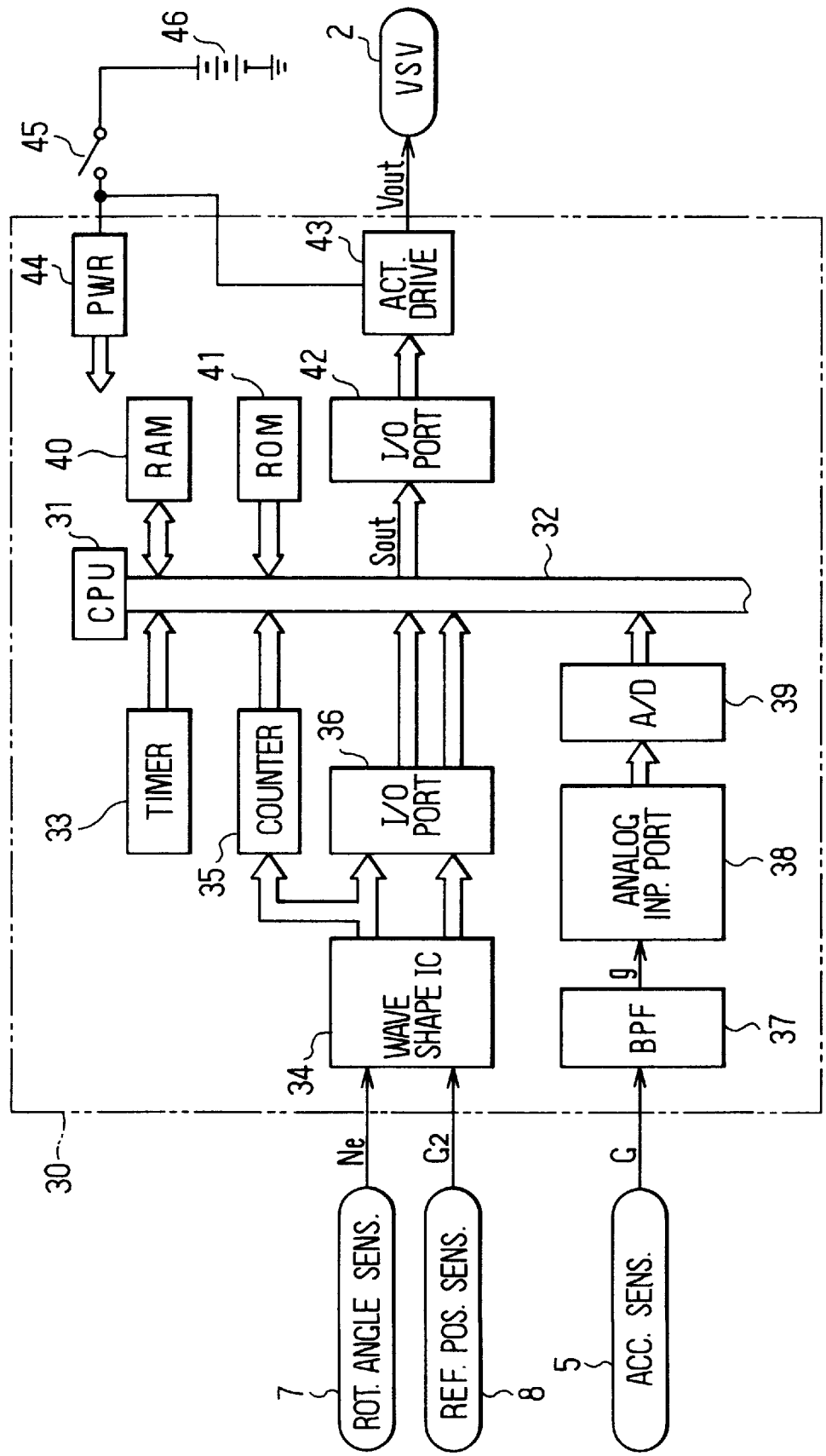
FIG. 3 is a block diagram showing an electrical structure of the electronically controlled engine mount according to the first through third embodiments.

FIG. 3 is a block diagram showing an electrical structure of the electronically controlled engine mount according to the first embodiment of the present invention. This will be explained with reference to graphs in FIGS. 4A–4G showing each signal waveform of a four-cycle straight four-cylinder engine to which the electronically controlled engine mount of the present embodiment has been applied.

In FIG. 3 the ECU 30 includes a CPU 31, a data bus 32, a timer 33, a waveform shaping circuit 34, a counter 35, an I/O port 36, a bandpass filter (BPF) 37, an analog input port 38, an A/D converter circuit 39, a RAM 40 for temporarily storing processing data of the CPU 31, a ROM 41 for storing a control program of the CPU 31, an I/O port 42, an actuator driving circuit 43 and a power circuit 44. When a key switch 45 is turned ON, power from a battery 46 is supplied to the power circuit 44 and the ECU 30 is activated.

Figure 4A:
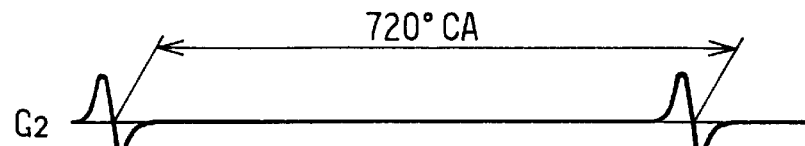
Figure 4C:
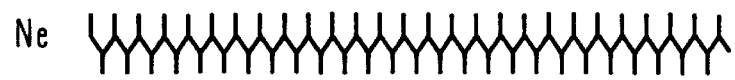

Then, the rotational angle signal Ne from the rotational angle sensor 7 and the reference position signal G2 from the reference position sensor 8 are input to the waveform shaping circuit 34 as waveforms shown FIGS. 4A and 4B. The waveform shaping circuit 34 shapes the rotational angle signal Ne and reference position signal G2 into rectangular waveforms shown in FIGS. 4C and 4D and then outputs them to the data bus 32 via the I/O port 36. The shaped rotational angle signal Ne is also counted by the counter 35 and a count value thereof is output to the data bus 32. Meanwhile, the acceleration signal G from the acceleration sensor 5 is input to the A/D converter circuit 39 via the bandpass filter 37 and the analog input port 38 as vibration acceleration g shown in FIG. 4E. It is also output to the data bus 32 after being converted from analog to digital form.

Based on the input vibration acceleration g, the CPU 31 outputs a control signal Sout to the actuator driving circuit 43 via the I/O port 42. Being supplied with power from the battery 46, the actuator driving circuit 43 outputs a driving voltage Vout to a coil 2a of the VSV 2 to control the ON/OFF state of the VSV 2. When the VSV 2 is ON, negative pressure from the vacuum tank 3b is introduced to the air chamber A of the engine mount 4 and when it is OFF, the atmospheric pressure is introduced to the air chamber A.

Next, a process of damping vibration input from the engine 10 by the engine mount 4 will be explained by describing operation of a four-cycle straight four-cylinder engine with reference to the-graphs of FIGS. 4A through 4G.

Because an expansion stroke is made four times during a time when a crankshaft turns twice (720° CA), i.e., one stroke is made per 180° CA in the four-cycle straight four-cylinder engine, and vibration caused by the explosion in the engine 10 (primary vibration) may be approximated by a sine wave having one cycle of 180° CA. This vibration is transmitted to the body 1 via the engine mount 4 and is detected together with other vibrations caused in driving the vehicle by the acceleration sensor 5. The bandpass filter 37 passes only signal components in the frequency range of 10 to 200 Hz resulting from the explosions in the engine 10 in the acceleration signal G of the acceleration sensor 5. The vibration acceleration g shown in FIG. 4E thus obtained is input to the CPU 31. It is assumed here that with respect to FIG. 4E, the vibration in the compressing direction is input from the engine 10 to the engine mount 4 and the mount rubber 11 bends downward when the vibration acceleration g is at its maximum MAX, and the vibration in the expanding direction is input to the engine mount 4 and the mount rubber 11 bends upward when the vibration acceleration g is at its minimum MIN.

Based on the vibration acceleration g, the ECU 30 executes opposite-phase control (vibration reducing control) to improve vibration transmission characteristics (e.g., dynamic spring constant and damping coefficient) of the engine mount 4 during idling drive time in order to reduce the vibration from the engine 10 by the engine mount 4. That is, as shown in FIG. 4F, it outputs the driving voltage Vout which turns the VSV 2 ON when the vibration acceleration g is greater than a neutral point 0 and outputs the driving voltage Vout which turns the VSV 2 OFF when the vibration acceleration g is smaller than the neutral point 0. Thereby, when the vibration acceleration g is large, the air chamber A communicates with the vacuum tank 3b because the VSV 2 is ON and the pressure P within the air chamber is reduced to the predetermined pressure within the vacuum tank 3b. When the vibration acceleration g is small, the VSV 2 is turned OFF, so that the air chamber A is opened to air and the pressure P thereof becomes almost equal to the atmospheric pressure.

The engine mount 4 receives downward force when the mount rubber 11 deflects downward by the vibration input from the engine 10 and receives upward force when the mount rubber 11 deflects upward. Meanwhile, the engine mount 4 generates downward force when the negative pressure is introduced to the air chamber A and generates upward force when the atmospheric pressure is introduced there. That is, resultant force of the vibration of the engine and the air pressure of the air chamber A is applied to the mount rubber 11. Here, because the VSV 2 is switched at the optimum timing and time width synchronously with the vibration of the engine, the pressure within the air chamber A is controlled to be optimal and the resultant force of the vibration of the engine and the air pressure is optimized to be transmitted to the bottom member 17 on the side of the body of the engine mount 4. As a result, the vibration from the engine 10 is reduced considerably by the engine mount 4.

It is noted that although the driving voltage Vout shown in FIG. 4F is a binary (ON/OFF) rectangular wave, the waveform of the pressure P within the air chamber shown in FIG. 4G becomes almost trapezoidal due to rising and falling of the internal air pressure. When the engine speed increases, the waveform of the pressure becomes almost triangular. Although the waveform of the pressure P of the air chamber is preferably a sine wave ideally, the result of experiment run by the inventors has shown that the effect of reducing the vibration from the engine 10 may be fully obtained even if the waveform is trapezoidal or triangular.

Because the amplitude of the vibration of the engine becomes small as the engine speed increases, it is desirable to reduce the absolute value of the maximum negative pressure Pmax of the air chamber A of the engine mount 4. While the absolute value of the maximum negative pressure Pmax of the pressure P within the air chamber becomes small due to a delay of response of the air pressure when the engine speed increases even if the negative pressure of the vacuum tank 3b is constant, there is a method of changing the ON time of the VSV 2 (duty ratio DR) corresponding to the engine speed as a method for optimizing the negative pressure all the time corresponding to the engine speed. A case when this method is used will be explained below.

Figure 23:
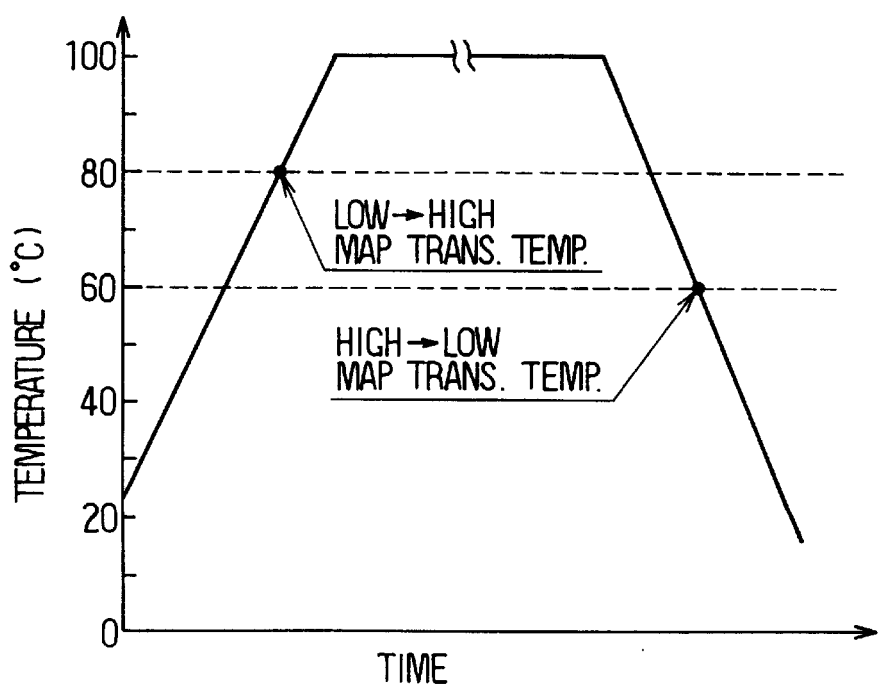
FIG. 23 is graph of map switching temperature versus time used in the first embodiment.

That is, as described later, the method uses a control map showing optimum phase angle Dq [° CA] and duty ratio DR [%] which correspond to an engine speed N [rpm] and states of temperature of cooling water Low (during cooling)/High (after warming) to be input to the engine mount 4 in an idling speed range shown in FIGS. 24A–24C corresponding to a map switching temperature shown in FIG. 23.

It is noted that the control map is prepared for two cases when the states of temperature of the cooling water is Low (during cooling) and High (after warming) with respect to the engine speed N [rpm] because there is a correlation between a transition state of temperature of the cooling water (lubricant oil) and the magnitude of the vibration level of the engine 10 and the optimum control value differs when the temperature of the cooling water is Low and High.

Figure 5:
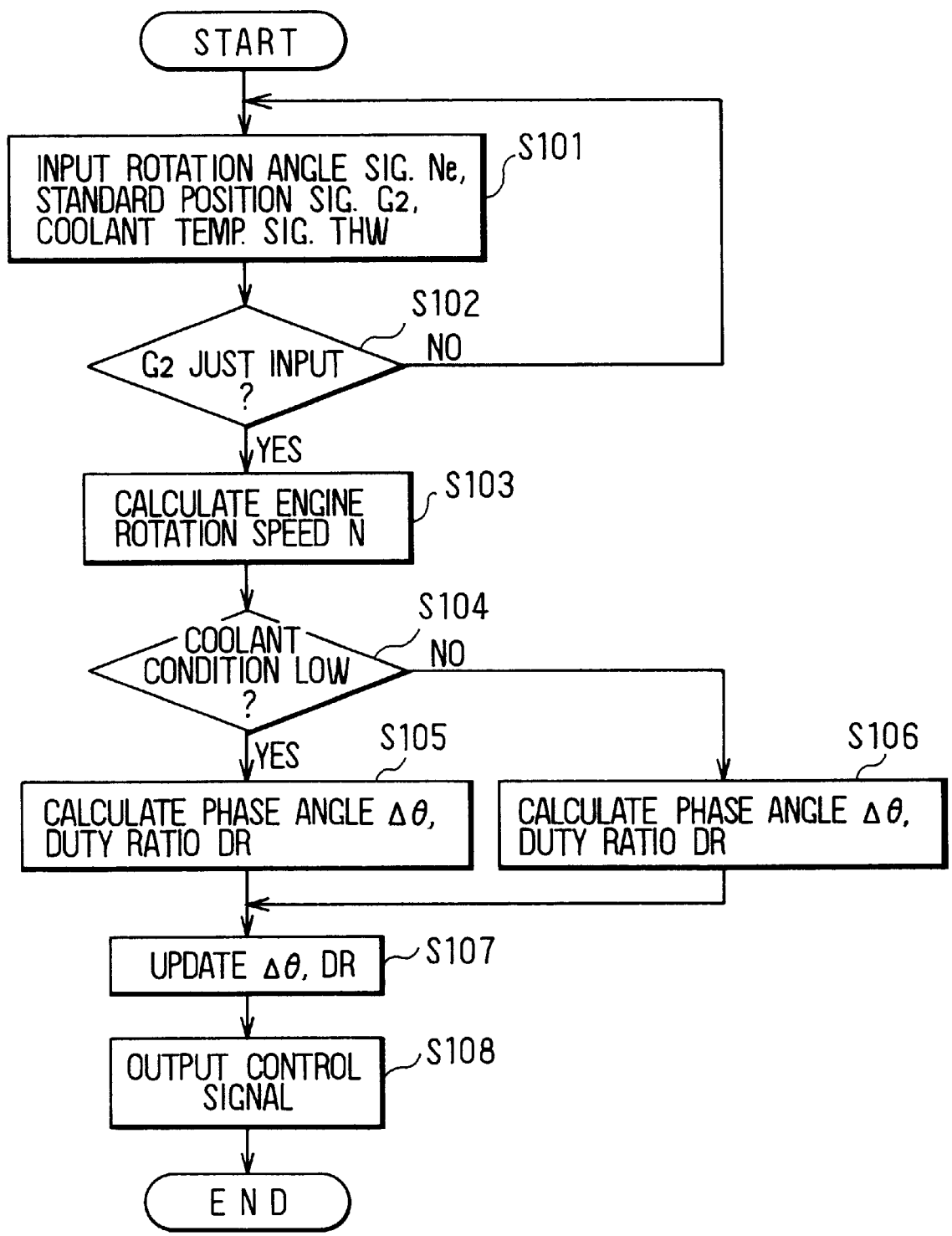
FIG. 5 is a flowchart showing a processing procedure of a CPU within an ECU used in the electronically controlled engine mount of the first through third embodiments.

FIG. 5 is a flowchart showing a processing procedure for executing the opposite-phase control (vibration reducing control) of the CPU 31 within the ECU 30 in the first embodiment. It is noted that this routine is executed on a regular periodic basis.

At first, the rotational angle signal Ne of the rotational angle sensor 7 and the reference position signal G2 of the reference position sensor 8 are input via the waveform shaping IC 34, and the cooling water temperature signal THW of the water temperature sensor 86 is input via the analog input port 27 and the A/D converter circuit 28 in Step 101. Next, the process advances to Step 102 to determine whether it is the time right after when the reference position signal G2 has been input or not. When this condition of Step 102 is not met, the process returns to Step 101 to repeat.

When the condition in Step 102 is met and the reference position signal G2 has been just input, the process advances to Step 103 to calculate the current engine speed N from the rotational angle signal Ne. Then, it is determined whether temperature of the cooling water has not reached 80° C. yet and the temperature of the cooling water is Low or not in Step 104. When the condition of Step 104 is met, a phase angle (delay time) Dq as a phase shift required for the reference position signal G2 when the temperature of the cooling water is Low (cooling time) and the duty ratio DR are calculated based on the maps in FIGS. 24A–24C stored in the ROM 41. On the other hand, when the condition of Step 104 is not met, a phase angle Dq as a phase shift required for the reference position signal G2 when the temperature of the cooling water is High (after warming) and the duty ratio DR are calculated based on the maps in FIGS. 24A–24C stored in the ROM 41.

The process in Step 105 or Step 106 is executed to calculate the phase angle Dq and the duty ratio DR. Then, those values Dq and D which have been stored in the RAM 40 are updated to newly-calculated values. That is, the phase angle Dq and the duty ratio DR are updated to the optimum values every time when the reference position signal G2 is input. Then, the process advances to Step 108 to calculate a value of the control signal Sout at this moment in time in consideration of the phase angle Dq and the duty ratio DR and to output it to the actuator driving circuit 43. This routine is then completed.

Based on the control signal Sout thus created, the actuator driving circuit 43 outputs the driving voltage Vout of the rectangular wave shown in FIG. 4D to the coil 2a of the VSV 2. The VSV 2 turns ON/OFF interlocking with the vibration of the engine and the pressure P within the air chamber A is changed as necessary.

Because the pressure P of the air chamber A to which the vibration from the engine 10 is input interlocks with the vibration and is optimally controlled in this present embodiment, the vibration transmission characteristics (dynamic spring constant and damping coefficient) of the engine mount 4 are optimized, thus reducing the transmission of the vibration of the engine reliably.

Figure 6:
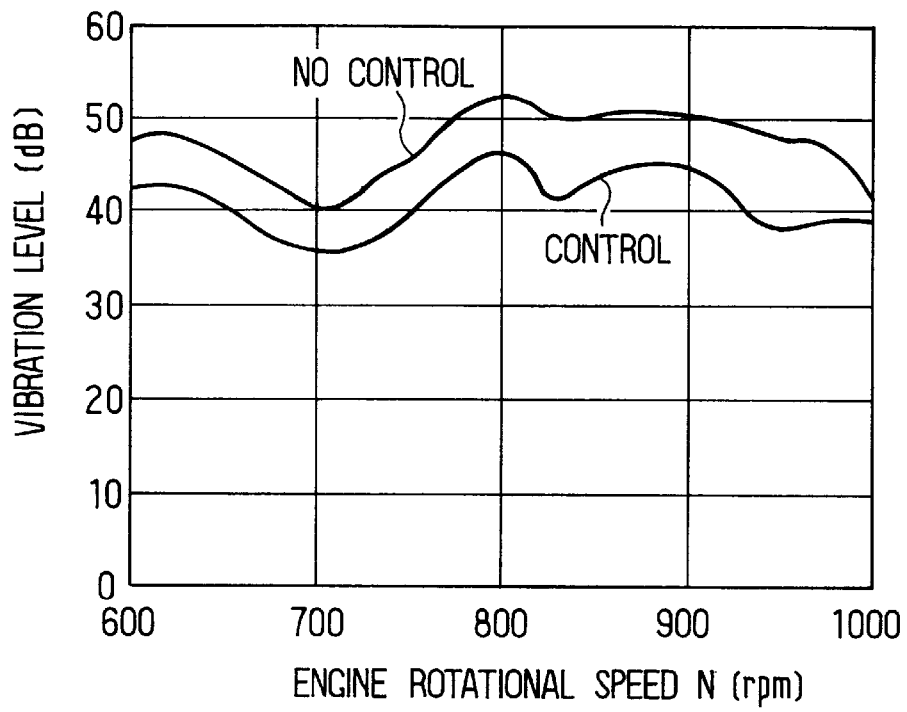
FIG. 6 is a graph showing vibration levels with respect to engine speeds when controlled by the electronically controlled engine mount of the first embodiment as compared with the case when no control is made.

FIG. 6 is a characteristic chart showing a vibration level [dB] with respect to an engine speed [rpm] when vertical vibration of a steering wheel of the vehicle carrying the straight four-cylinder engine to which the electronically controlled engine mount of the present embodiment has been applied is controlled as compared to the case when no control is made. It is noted that, as for the driving condition, the vibration level is measured by sweeping the engine speed during idling in the N (neutral) range and a non-load state of the A/T (automatic transmission) after warming up the engine. When the vibration level is indicated by an overall value, it is apparent from this characteristic chart that the vibration level has been reduced by 4 to 10 dB when the control is made as compared to the case when no control is made.

As described above, according to the electronically controlled engine mount of the present embodiment, the VSV 2 is used and the negative pressure from the intake manifold 3a which the engine 10 is already equipped with is utilized as the actuating source, so that an inexpensive and high performance active control engine mount may be provided.

Thus, the electronically controlled engine mount of the present embodiment includes the engine mount 4 which is disposed between the body 1 and the engine 10 and which has the air chamber A into which air is sealed and whose volume is changed by the vibration input from the body work 1 and the engine 10, pressure switching means including the VSV 2 which is capable of changing the pressure within the air chamber A to the predetermined negative pressure supplied from the vacuum tank 3b in which the negative pressure from the intake manifold 3a of the engine 10 is accumulated or to the atmospheric pressure, and control means implemented by the ECU 30 which is capable of changing the vibration transmission characteristics of the engine mount 4 by controlling the pressure within the air chamber A by driving the pressure switching means in correspondence with the vibrations due to explosions in the engine 10 when the engine 10 is placed in a predetermined driving state.

Accordingly, the VSV 2 as the pressure switching means is driven by the ECU 30 as the control means in correspondence with the vibration due to explosions in the engine 10 when the engine 10 is placed in the predetermined driving state and the pressure within the air chamber A of the engine mount 4 is switched to the predetermined negative pressure supplied from the vacuum tank 3b which accumulates negative pressure from the intake manifold 3a of the engine 10 or to the atmospheric pressure. Therefore, the vibration transmission characteristics of the engine mount 4 may be optimized and the vibration from the engine 10 may be reduced.

The electronically controlled engine mount of the first embodiment also includes signal generating means which is implemented by the ECU 30 for generating the driving voltage Vout which is a signal having the delay time Dq as a predetermined phase difference which changes corresponding to the engine speed N of the engine 10 in the same cycle with respect to the primary vibration due to explosions in the engine 10, and the control means implemented by the ECU 30 controls the pressure switching means including the VSV 2 using the signal generated by the signal generating means. The VSV 2 is controlled by this driving voltage Vout. Thereby, the vibration transmission characteristics of the engine mount 4 may be optimized.

The electronically controlled engine mount of the present embodiment also comprises rotational angle signal detecting means including the rotational angle sensor 7 for detecting the rotational angle signal Ne which indicates a rotational angle of the engine 10 and reference position signal detecting means including the reference position sensor 8 for detecting the reference position signal G2 which indicates the reference position of a crank angle of the engine 10. The signal generating means implemented by the ECU 30 generates the driving voltage Vout having the delay time Dq and the duty ratio DR which changes corresponding to the engine speed N of the engine 10 in the same cycle with respect to the primary vibrations due to explosions in the engine 10 based on the rotational angle signal Ne and the reference position signal G2. Therefore, the vibration transmission characteristics of the engine mount 4 may be optimized without adding another sensor such as the acceleration sensor 5.

The driving voltage Vout is also created by the ECU 30 based on the temperature state of the engine 10 detected by the water temperature sensor 86 as temperature state detecting means, in addition to the vibration input from the engine 10. The vibration transmission characteristics of the engine mount 4 may be changed freely by controlling the pressure switching means including the VSV 2 by this driving voltage Vout. Therefore, adequate vibration transmission characteristics may be obtained even if the temperature state of the engine 10 changes or the absolute spring constant of the engine mount 4, the vibration of the engine and vibration transmitting force of the vibration transmitting path change.

Further, in the electronically controlled engine mount of the present embodiment, the control means implemented by the ECU 30 switches a plurality of maps stored in advance based on the temperature state of the engine 10 detected by the water temperature sensor 86 as the temperature state detecting means in creating the driving voltage Vout. Therefore, the vibration transmission characteristics of the engine mount 4 may be optimized by the driving voltage Vout created by the ECU 30.

Although the temperature of the cooling water has been used as the temperature state of the engine 10 which is correlated with the ambient temperature of the engine mount 4 in the embodiment described above, the present invention is not confined to such a configuration, and temperature of lubricant oil of the engine 10 which has a similar transition state with the temperature of the cooling water with respect to elapsed time may be used. In this case, an oil temperature sensor for outputting a lubricant oil temperature signal related to a state of temperature of the lubricant oil of the engine 10 is disposed on the engine 10 instead of the water temperature sensor 86. An output signal from the oil temperature sensor is input to the ECU 30.

The primary vibration caused by the explosions in the engine 10 of the electronically controlled engine mount of the first embodiment may be controlled by feeding back the acceleration signal G detected by the acceleration sensor 5 attached at least one place among the body 1, the engine 10 and the engine mount 4.

That is, the primary vibration caused by the explosion in the engine 10 may be properly detected by attaching the acceleration sensor 5 adequately at the body 1, the engine 10 or the engine mount 4. Thereby, the waveform of the driving voltage Vout may be caused to match the vibration of the engine 10.

Further, according to the electronically controlled engine mount of the first embodiment, the control means which is implemented by the ECU 30 drives and controls the VSV 2 as the pressure switching means with respect to a duty ratio based on parameters related to the vibration caused by the explosion in the engine 10. Because the VSV 2 is thus driven and is controlled with respect to the duty ratio based on the parameters related to the vibration of the engine 10, the vibration transmission characteristics of the engine mount 4 may be optimized further.

[Second Embodiment]

Figure 7:
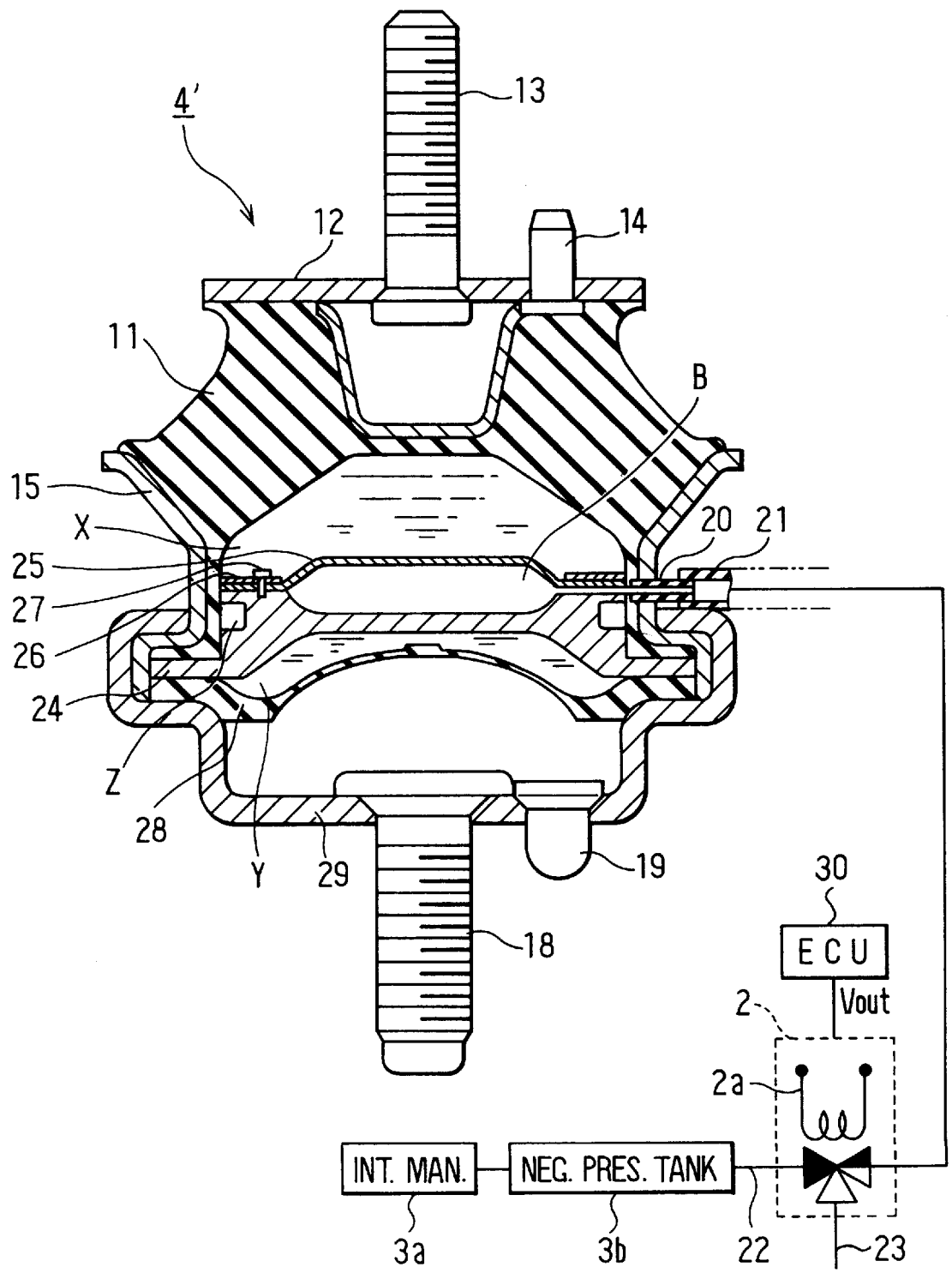
FIG. 7 is a cross-sectional view showing the detailed structure of an engine mount and peripheral devices thereof of an electronically controlled engine mount according to the second preferred embodiment.

FIG. 7 is a cross-sectional view showing a detailed structure of an engine mount and peripheral devices thereof of the electronically controlled engine mount according to the second embodiment of the present invention. The engine and the peripheral devices thereof to which the electronically controlled engine mount of the second embodiment has been applied are the same as those shown in FIG. 1 in which the schematic structural drawing of the first embodiment is shown. Further, the block diagram in FIG. 3 showing the electrical structure of the first embodiment, the graphs in FIGS. 4A–4G showing each signal waveform and the flowchart in FIG. 5 are also the same, and therefore their explanation will be omitted here.

An engine mount 4' of the second embodiment adopts the known orifice liquid seal method and the structure thereof other than that is the same as the engine mount 4 of the first embodiment shown in FIG. 2. Accordingly, the present embodiment will be explained with emphasis on points different from the engine mount 4 in FIG. 2.

In FIG. 7, a partition 24 which is thin at the middle thereof is inserted below the cylinder-like side member 15 which is spliced around the lower part of the mount rubber 11 made of a domed thick elastic member which is opened downward of the engine mount 4'. Fixed above the partition 24 by a plurality of bolts 27 is a thin diaphragm 25 whose peripheral edge portion is pressed by a ringed plate 26.

A diaphragm 28 which is thin at the middle thereof and curved upward is inserted below the partition 24. The side member 15, the lower end of the mount rubber 11, the peripheral edges of the partition 24 and the diaphragm 28 are caulked and fixed at the same time by a bottom member 29.

After constructing the device as described above, non-compressive fluid is sealed in a space closed by the mount rubber 11 and the diaphragm 25, thus creating a main fluid chamber X, and an air chamber B is created in a space closed by the diaphragm 25 and the partition 24. The non-compressive fluid is also sealed in a space closed by the partition 24 and the diaphragm 28, thus creating a sub-fluid chamber Y. The main fluid chamber X and the sub fluid chamber Y communicate through an orifice passage Z created at the outer peripheral edge of the partition 24. The non-compressive fluid flows from the main fluid chamber X which deforms corresponding to input vibration to the sub-fluid chamber Y via the orifice passage Z to obtain a vibrating isolating effect.

An air duct pipe 20 which communicates with the outside is linked to the air chamber B closed by the thin diaphragm 25 and the partition 24 of the present embodiment and the other end of a connection pipe 21 which is connected to the air duct pipe 20 is linked to the VSV 2 similarly to the first embodiment.

According to the second embodiment, the VSV 2 is turned ON/OFF at the optimum delay time Dq and the optimum ON time T interlocking with the vibration of the engine to switch the negative pressure and the atmospheric pressure similarly to the first embodiment, so that the pressure within the air chamber B is optimally controlled. Then, the pressure of the fluid in the main fluid chamber X may be controlled freely in correspondence with the change of the pressure within the air chamber B and the vibration transmission characteristics (e.g., dynamic spring constant and damping coefficient) of the engine mount 4' may be optimized to shut off the vibration of the engine significantly. Further, because the orifice liquid seal method is applied in the second embodiment, it is possible to achieve the reduction of engine shake in a low frequency band and the reduction of engine noise caused by the drop of the dynamic spring constant in the high frequency band by the effect of the orifice.

Thus, according to the electronically controlled engine mount of the present embodiment, the engine mount 4' includes the main fluid chamber X which is provided adjacent to the air chamber B via the diaphragm 25 as an elastic film member, into which the non-compressive fluid is sealed and whose volume is changed by the vibration input from the engine 10 and the sub fluid chamber Y which is provided adjacent to the air chamber B via the partition 24, into which the non-compressive fluid is sealed, which communicates with the main fluid chamber X via the orifice passage Z as a communicating hole created at part of the partition 24 and whose volume is allowed to change.

Accordingly, the main fluid chamber X and the sub fluid chamber Y which are provided adjacent to the air chamber B and into which the non-compressive fluid is sealed communicate via the orifice passage Z and their volume is changed by the vibration input from the body 1 and the engine 10. Therefore, the vibration transmission characteristics of the engine mount 4' may be optimized, i.e., the engine noise in the high frequency band caused by the vibration from the engine 10 may be reduced by the effect of the sealed liquid in the liquid seal mount and the engine shake in the low frequency band may be reduced by the liquid column resonance effect of the orifice passage Z which connects the main fluid chamber X with the sub-fluid chamber Y.

The electronically controlled engine mount of the present embodiment also includes the signal generating means which is implemented by the ECU 30 for generating the driving voltage Vout which is the signal having the delay time Dq as a predetermined phase difference which changes corresponding to the engine speed N of the engine 10 in the same cycle with respect to the primary vibrations due to explosions in the engine 10, and the control means implemented by the ECU 30 controls the pressure switching means including the VSV 2 using the signal generated by the signal generating means. Therefore, the vibration transmission characteristics of the engine mount 4' may be optimized.

The electronically controlled engine mount of the present embodiment also includes the rotational angle signal detecting means including the rotational angle sensor 7 for detecting the rotational angle signal Ne which indicates a rotational angle of the engine 10 and the reference position signal detecting means including the reference position sensor 8 for detecting the reference position signal G2 which indicates the reference position of a crank angle of the engine 10. The signal generating means implemented by the ECU 30 generates the driving voltage Vout having the delay time Dq which changes corresponding to the engine speed N of the engine 10 in the same cycle with respect to the primary vibration due to explosions in the engine 10 based on the rotational angle signal Ne and the reference position signal G2. Therefore, the vibration transmission characteristics of the engine mount 4' may be optimized without adding another sensor or the like.

The primary vibrations due to the explosions in the engine 10 of the electronically controlled engine mount of the present embodiment may be controlled by feeding back the acceleration signal G detected by the acceleration sensor 5 attached at least one place among the body work 1, the engine 10 and the engine mount 4'.

That is, the primary vibration caused by the explosions in the engine 10 may be properly detected by attaching the acceleration sensor 5 adequately at the body 1, the engine 10 or the engine mount 4'. Thereby, the waveform of the driving voltage Vout may match the vibration of the engine 10.

Further, according to the electronically controlled engine mount of the present embodiment, the control means which is implemented by the ECU 30 drives and controls the VSV 2 as the pressure switching means with respect to the duty ratio based on parameters related to the vibration caused by the explosion in the engine 10. Because the VSV 2 is thus driven and is controlled with respect to the duty ratio based on the parameters related to the vibration of the engine 10, the vibration transmission characteristics of the engine mount 4' may be optimized further.

[Third Embodiment]

Figure 8:
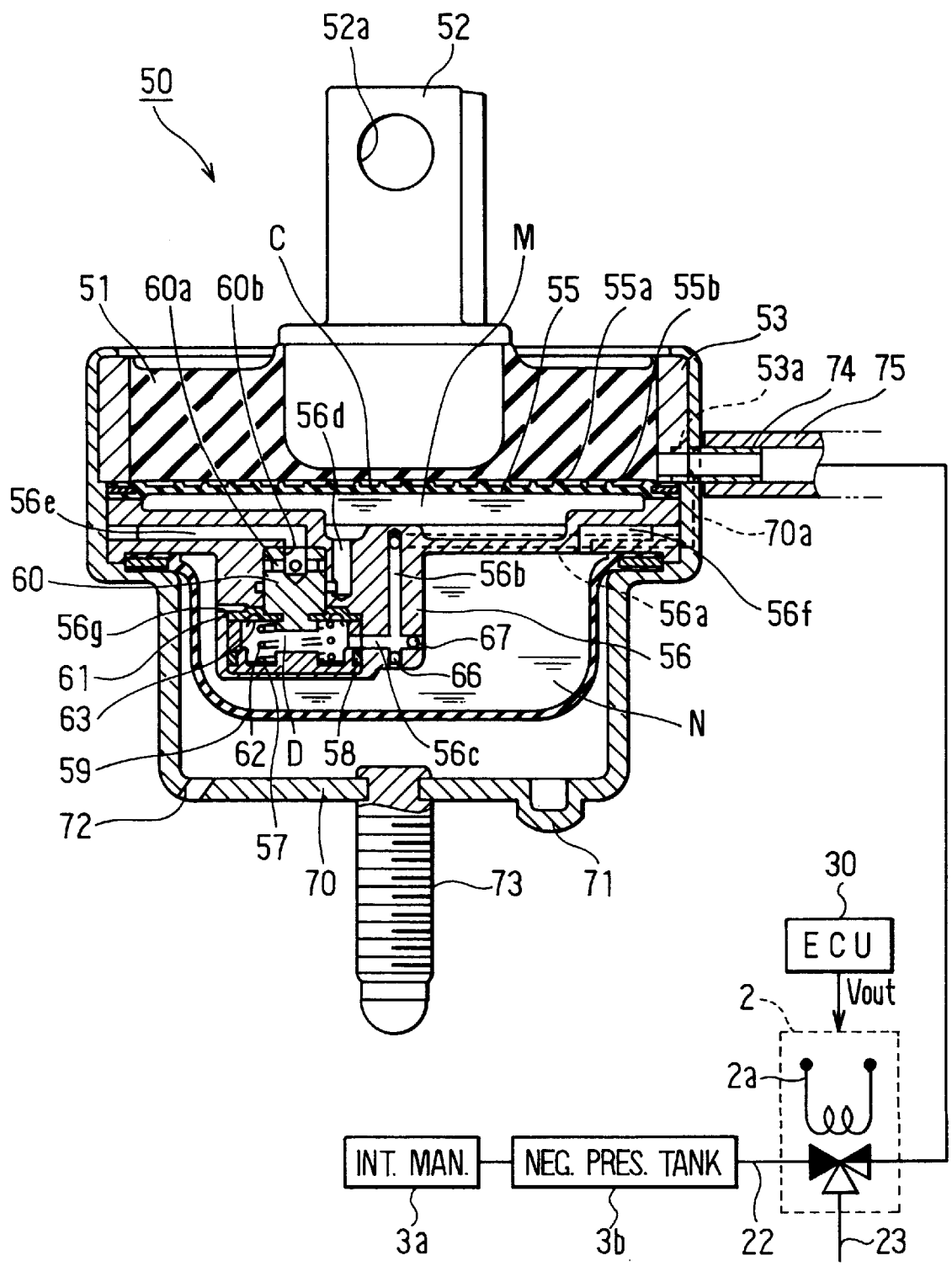
FIG. 8 is a cross-sectional view showing the detailed structure of an engine mount and peripheral devices thereof of an electronically controlled engine mount according to the third preferred embodiment.

FIG. 8 is a cross-sectional view showing a detailed structure of an engine mount and peripheral devices thereof of the electronically controlled engine mount according to the third embodiment of the present invention. The engine and the peripheral devices thereof to which the electronically controlled engine mount of the third embodiment is applied are the same as those shown in FIG. 1 in which the schematic structural drawing of the first embodiment is shown. Further, the block diagram in FIG. 3 showing the electrical structure of the first embodiment, the graphs in FIGS. 4A–4G showing each signal waveform and the flowchart in FIG. 5 also apply here in the same manner and therefore, their explanation will be omitted here.

In FIG. 8, a fixing member 52 which protrudes upward to place and secure the engine 10 and which has a mounting hole 52a is embedded at the center of a mount rubber (rubber vibration isolator) 51 made of a thick elastic material of an engine mount 50. A cylindrical side member 53 is welded around the mount rubber 51 and is fixed in a body. Disposed below the mount rubber 51 is a disk-like diaphragm 55 whose peripheral edge portion reinforced by a ringed member is fixed to a partition 56 below thereof. Semi-spherical large projections 55a and small projections 55b arrayed in a predetermined manner are created on the surface of the diaphragm 55 on the side of the mount rubber 51. Further, disposed below the partition 56 is a bowl-like diaphragm 59 whose peripheral edge portion reinforced by a ringed plate member is fixed.

Then, the partition 56 to which the diaphragm 55 and the diaphragm 59 are fixed and a side member 53 to which the fixing member 52 and the mount rubber 51 are fixed and inserted into a stepped cylindrical outer member 70 having a bottom and are caulked in a body.

By constructing the device as described above, an air chamber C is created in a space closed by the mount rubber 51 and the diaphragm 55, a main fluid chamber M is created by sealing non-compressive fluid to a space closed by the diaphragm 55 and the partition 56, and a sub-fluid chamber N is created by sealing the non-compressive fluid to a space closed by the partition 56 and the diaphragm 59, respectively. Further, a bolt 73 which protrudes downward to connect and secure the body 1 is press-fitted to the bottom of the outside member 70 at the center thereof. A stopper projection 71 for stopping the assembly from turning with respect to the body work 1 is provided and a hole 72 for opening a space surrounded by the diaphragm 59 and the outside member 70 to the air is perforated around the bolt 73.

Further, the air chamber C is connected to the air chamber D created within the partition 56 through a passage 53a created by cutting away a part of the outer peripheral face of the side member 53 a passage 70a created by cutting away a part of the inner peripheral face of the outside member 70, a passage 56a of the partition 56, and passage 56b and 56c in the middle of the partition 56. It is noted that a ball 66 is driven into one end of the passage 56b to close it and a ball 67 is driven into one end of the passage 56c to close it, respectively.

A valve 60 is disposed above the air chamber D slidably in the vertical direction and a diaphragm 61 is attached at the lower end of the valve 60 via a washer 63. The valve 60 which is in a body with the washer 63 is moved upward by the urging force of a spring 62 when the air chamber D has the atmospheric pressure. It is noted that the air-tightness of the air chamber D is maintained by press-fitting a bottom member 57 by using the diaphragm 61 and an O-ring 58 and by caulking it to the partition 56. In this state, the non-compressive fluid within the main fluid chamber M cannot flow to the sub fluid chamber N, or in the opposite direction, through a passage 56d of the partition 56, passages 60a and 60b within the valve 60 and passages 56e and 56f. It is noted that the upper face of the diaphragm 61 contacts the non-compressive fluid within the sub fluid chamber N via a passage 56g perforated through the partition 56.

An air duct pipe 74 which penetrates through the side member 53 and passes through part of the mount rubber 51 is connected to the outside member 70 to connect the air chamber C closed by the mount rubber 51 and the diaphragm 55 and the air chamber D within the partition 56 with the outside. The other end of a connection pipe connected to the air duct pipe 74 is linked to the VSV 2 similarly to the first embodiment.

According to the present embodiment, during the idling drive time, the VSV 2 is turned ON/OFF at the optimal delay time Dq and the optimal ON time T synchronously with the vibration of the engine to switch negative pressure and atmospheric pressure similarly to the first embodiment. At this time, because the negative pressure of the air chamber D is not at its maximum, the passage 56d of the partition 56 and the passage 60a of the valve 60 are kept in the non-communication state and the non-compressive fluid cannot flow between the main fluid chamber M and the sub-fluid chamber N. Therefore, the vibration transmission characteristics (e.g., dynamic spring constant and damping coefficient) of the engine mount 50 during the idling drive time may be optimized and the vibration of the engine may be fully reduced because the pressure in the air chamber C is adequately controlled interlocking with the vibration due to the explosions in the engine.

Further, because the VSV 2 is still connected to the negative pressure side and the negative pressure within the air chamber D becomes maximum during the time beside the idling drive time, the valve 60 is moved downward in opposition to the urging force of the spring 62 and the passage 56d of the partition 56 and the passage 60a of the valve 60 is put into the communication state. Accordingly, the non-compressive fluid can freely move between the main fluid chamber M and the sub-fluid chamber N and the engine vibration in the low frequency band may be suppressed by the liquid column resonant effect caused by the orifice.

Thus, according to the electronically controlled engine mount of the third embodiment, the engine mount 50 includes the main fluid chamber M which is provided adjacent to the air chamber C through the intermediary of the diaphragm 55 as the elastic membrane, to which the non-compressive fluid is sealed and whose volume is changed by the vibration input from the body work 1 and the engine 10, the sub-fluid chamber N to which the non-compressive fluid is sealed, which communicates with the main fluid chamber M via the passages 56d, 56e and 56f created as the communication holes in the part of the partition 56 and whose volume is allowed to change, and interrupting means including the valve 60 which is provided on the way of the flow path of the passages 56d, 56e and 56f and which puts the flow path of the passages 56d, 56e and 56f into the communication or non-communication state, the passages 60a and 60b of the valve 60, the diaphragm 61, the spring 62, the washer 63, the passages 53a, 70a, 56a, 56b, 56c and 56g and the air chamber D. The control means implemented by the ECU 30 controls the interrupting means corresponding to the pressure switching means including the VSV 2. Therefore, the vibration transmission characteristics may be optimized because the volume of the engine mount 50 is changed by the vibration input from the body work 1 and the engine 10. That is, the engine noise in the high frequency band caused by the vibration from the engine 10 may be reduced by switching the pressure within the air chamber C. Further, the engine vibration in the low frequency band may be reduced by the passages 56d, 56e and 56f as well as the passages 60a and 60b of the valve 60 which communicate the main fluid chamber M and the sub-fluid chamber N.

The electronically controlled engine mount of the present embodiment also includes the signal generating means which is implemented by the ECU 30 for generating the driving voltage Vout which is the signal having the delay time Dq as a predetermined phase difference which changes corresponding to the engine speed N of the engine 10 in the same cycle with respect to the primary vibrations due to explosions in the engine 10, and the control means achieved by the ECU 30 controls the pressure switching means including the VSV 2 by the signal generated by the signal generating means. Thus, the VSV 2 is controlled by the driving voltage Vout. Therefore, the vibration transmission characteristics of the engine mount 50 may be optimized.

The electronically controlled engine mount of the third embodiment also includes the rotational angle signal detecting means including the rotational angle sensor 7 for detecting the rotational angle signal Ne which indicates a rotational angle of the engine 10 and the reference position signal detecting means including the reference position sensor 8 for detecting the reference position signal G2 which indicates the reference position of a crank angle of the engine 10. The signal generating means implemented by the ECU 30 generates the driving voltage Vout having the delay time Dq which changes corresponding to the engine speed N of the engine 10 in the same cycle with respect to the primary vibration of explosion in the engine 10 based on the rotational angle signal Ne and the reference position signal G2. Thus, the vibration transmission characteristics of the engine mount 50 may be optimized without adding another sensor or the like.

The primary vibrations caused by the explosions in the engine 10 of the electronically controlled engine mount of the present embodiment may also be controlled by feeding back the acceleration signal G detected by the acceleration sensor 5 attached at least one place among the body 1, the engine 10 and the engine mount 50.

That is, the primary vibration caused by the explosions in the engine 10 may be properly detected by attaching the acceleration sensor 5 adequately at the body 1, the engine 10 or the engine mount 50. Thereby, the waveform of the driving voltage Vout may be caused to match the vibration of the engine 10 and the feedback control can be made by this signal.

Further, according to the electronically controlled engine mount of the third embodiment, the control means which is implemented by the ECU 30 drives and controls the VSV 2 as the pressure switching means with respect to the duty ratio based on parameters related to the vibrations caused by the explosions in the engine 10. Because the VSV 2 is thus driven and is controlled with respect to the duty ratio based on the parameters related to the vibration of the engine 10, the vibration transmission characteristics of the engine mount 50 may be optimized further.

In addition to that, according to the electronically controlled engine mount of the third embodiment, the engine mount 50 has at least one of the large number of projections 55a and 55b on either or both of the diaphragm 55 as the elastic membrane composing the air chamber C and the mount rubber 51 as the member facing to the diaphragm 55.

Accordingly, the semi-spherical higher projections 55*a* formed on the diaphragm 55 assure the minimum volume when the pressure within the air chamber C becomes a predetermined negative pressure and the semi-spherical shorter projections 55*b* prevent the inner face of the diaphragm 55 on the side of the air chamber C from adhering to and becoming inseparable with the mount rubber 51.

Although the acceleration signal G from the acceleration sensor 5 has been used to generate the optimum driving voltage Vout by synchronizing with the vibration of the engine 10 in the embodiments described above, the present invention is not so limited, and the vibration of the engine caused by the explosions in the engine 10 may be computed, estimated and controlled artificially by using the rotational angle signal Ne from the rotational angle sensor 7 and the reference position signal G2 from the reference position sensor 8.

Further, although the ON time T (duty ratio DR of time connected to the negative pressure side) of the VSV 2 is adjusted corresponding to the engine speed with respect to the maximum negative pressure of the air chambers A, B and C (air chamber D) in the embodiment described above, the negative pressure of the vacuum tank 3*b* may be adjusted corresponding to the engine speed while keeping the duty ratio of time of switching negative pressure and atmospheric pressure constant.

Then, although the negative pressure from the intake manifold 3*a* of a gasoline engine has been used as the source of negative pressure of the vacuum tank 3*b* in the embodiments described above, negative pressure of a vacuum pump used in a diesel engine may be also used instead.

Further, although the delay time Dq and the ON time T of the VSV 2 (duty ratio DR) have been calculated from the engine speed N by using a map in order to calculate the control signal Sout to be output to the actuator driving circuit 43 in the embodiments described above, the feedback control for reducing the vibration may be made by using the vibration acceleration g based on the acceleration signal G from the acceleration sensor 5, instead of the map.

It is noted that although the ON time T of the VSV 2 in which the vibration corresponding to the engine speed N becomes minimal has been found in Step 104 in FIG. 5 in the embodiment described above, the method for driving the VSV 2 is not confined to that technique. For example, the VSV 2 may be driven and controlled with respect to the duty ratio and the driving duty ratio may be found from the map which has been optimized in advance.

It is noted that although the semi-spherical projections whose height and size are different have been provided on the diaphragm 55 in the embodiment described above, a ringed projection may be provided instead. Further, the projections may be provided on the side of the mount rubber 51 or on the side of the partition 24 in the second embodiment.

[Fourth Embodiment]

Figure 9:
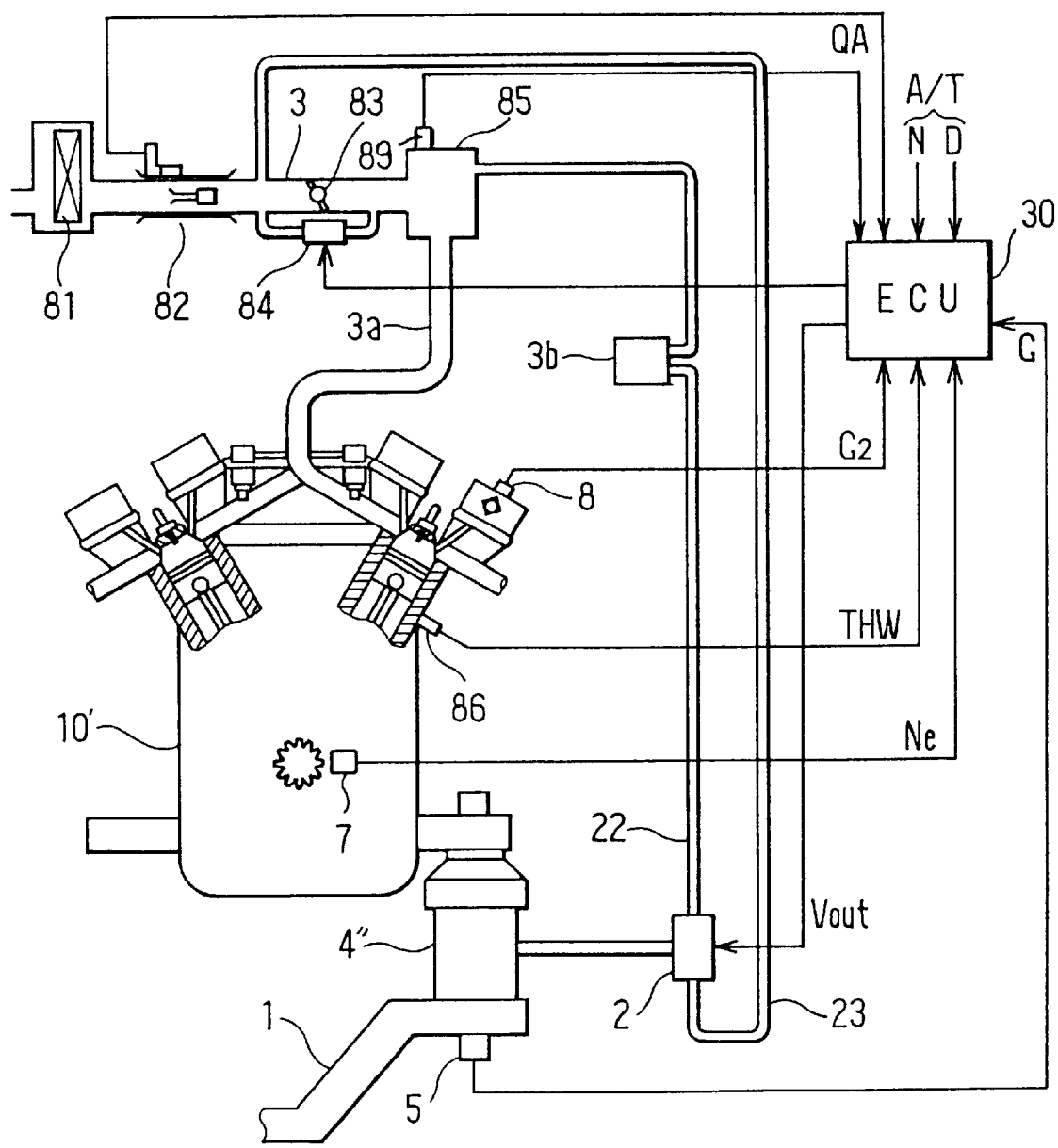
FIG. 9 is a schematic drawing showing a structure around an engine to which an electronically controlled engine mount of a fourth preferred embodiment of the present invention is applied.

FIG. 9 is a schematic drawing showing a structure around an engine to which an electronically controlled engine mount of a fourth embodiment of the present invention has been applied. It is noted that in this Figure, the same or corresponding components or parts with those in FIG. 1 showing the first embodiment will be denoted by the same reference numerals and symbols and their detailed explanation will be omitted here. The electronically controlled engine mount of the fourth embodiment is composed of an engine mount 4" and peripheral devices thereof similar to those in FIG. 7 showing the second embodiment and its detailed explanation will be omitted here. The engine mount 4" of the fourth embodiment is called also as a vacuum active control engine mount (V-ACM). FIG. 9 shows the electronically controlled engine mount which has been applied to a front mount of an engine 10' of a V-type 6-cylinder gasoline engine model. It is noted that rubber vibration isolator mounts not actively controlled or the known orifice liquid seal mounts are disposed at three places such as the rear, beside the front mount between the engine 10' and the body 1.

FIG. 9 shows an air cleaner 81 at the most upstream side of the intake pipe 3 and at the downstream side thereof, an ISC (idle speed control) valve 84 for controlling a quantity of air to maintain an idling speed at a predetermined speed by bypassing a hot wire airflow meter 82 which outputs a signal QA representative of a quantity of intake air, and a throttle valve 83. Then, the intake air which has passed through the throttle valve 83 within the intake pipe 3 or the ISC valve 84 is introduced to each cylinder of the engine 10' via a surge tank 85 and the intake manifold 3*a*.

As shown in FIG. 7, the air duct pipe 20 which communicates with the outside is linked to the air chamber b of the engine mount 4' and the other end of the connection pipe 21 connected to the air duct pipe 20 is connected to a common port among three ports of the VSV 2. Further, as shown in FIG. 9, the other two ports of the VSV 2 are connected to the negative pressure introducing pipe 22 linked to the vacuum tank 3*b* for accumulating negative pressure from the surge tank 85 at the upstream side of the intake manifold 3*a* of the engine 10' by the non-return valve (not shown) and with an atmospheric air introducing pipe 23 for introducing air (atmospheric pressure) which has been taken in through the air cleaner 81 and exits within the intake pipe 3 at the upstream of the throttle valve 83.

When the V-ACM is used thus for the gasoline engine, the negative pressure of the intake pipe is utilized as the source of negative pressure and atmospheric pressure and negative pressure is switched alternately by the VSV 2 which is connected with the V-ACM, so that the outside air flows into the intake pipe 3. Accordingly, the air (atmospheric pressure) within the intake pipe 3 must be taken from the part thereof between the airflow meter 82 and the throttle valve 83 in order to not influence the A/F (air-fuel ratio) of the engine. It is noted that in the present embodiment, the VSV 2 connected with the air chamber B of the engine mount 4' shown in FIG. 7 is turned ON/OFF based on the driving voltage Vout from the ECU 30, introducing atmospheric pressure when it is ON and negative pressure when it is OFF. That is, the pressure within the air chamber B is switched to predetermined negative pressure or to atmospheric pressure at a timing opposite that of the driving voltage Vout shown in FIG. 4D in the first embodiment described above in order to reduce power consumption. Further, there are the rotational angle sensor 7 linked with the crankshaft of the engine 10' to output the rotational angle signal Ne related to the speed thereof, the reference position sensor 8 outputting the reference position signal G2 related to the reference angle of the crank and the water temperature sensor 86 which outputs the cooling water temperature signal THW related to the temperature of water within the cylinder of the engine 10'.

Therefore, the structure of the fourth embodiment is similar to that of the first embodiment shown in FIG. 3, and the signal of quantity of intake air QA from the airflow meter 82, the cooling water temperature signal THW from the water temperature sensor 86 and shift signals N (neutral range) and D (drive range) from the A/T (automatic transmission) are added as shown in FIG. 9, beside the signal G from the acceleration sensor 5, the signal Ne from the rotational angle sensor 7 and the signal G2 from the reference position sensor 8.

Figure 10A:
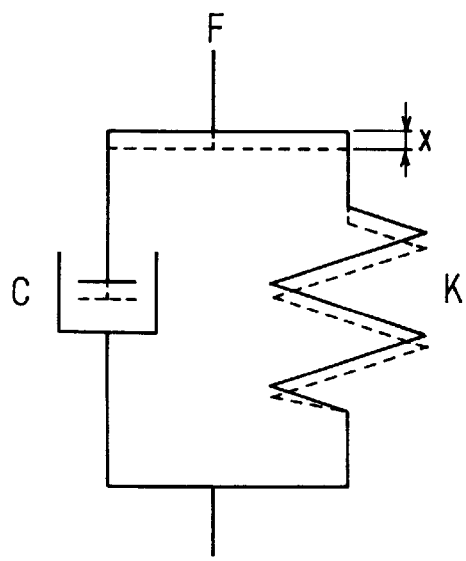
FIGS. 10A and 10B are explanatory diagrams showing a vibration model and a vector of a dynamic load of the electronically controlled engine mount according to the fourth embodiment.
Figure 10B:
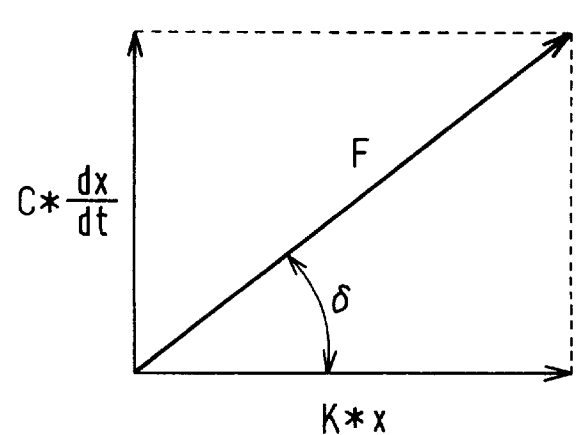

When a dynamic load is applied to a large viscous resistance material such as rubber, generally its vibration model turns out as shown in FIG. 10A and the dynamic load F vector is as shown in FIG. 10B and may be expressed by a sum of a displacement x and its velocity (dx/dt) as shown in Equation (1) below, where d is a loss angle which is time delay of the displacement x with respect to the dynamic load F.

$$F = Kd \cdot x + C \cdot (dx/dt) = Kd \cdot x + (Ki/\omega) \cdot (dx/dt) \qquad (1)$$

where Kd is a storage spring constant, Ki is a loss spring constant and C is a damping coefficient.

Further, a (Kd–Ki) plane in which a horizontal axis represents the storage spring constant Kd [N/mm] and a vertical axis represents the loss spring constant Ki [N/mm] is generally used to express the engine mount characteristics. In the V-ACM as the engine mount 4" used in the fourth embodiment, a characteristic chart of the V-ACM control shown in FIG. 11 maybe obtained by changing the delay time Dq (phase angle) in the driving voltage Vout as the rectangular wave input to the VSV 2 with respect to a predetermined frequency (e.g., 20 Hz) and a predetermined negative pressure of the intake pipe (e.g., 50% to 20% of the duty ratio) by one cycle (360°) per 20°. Circles shown in the characteristic chart will be referred to as "control circles" in the explanation hereinbelow. That is, it means that it is possible to control so long as the characteristics fall within this "control circle".

Figure 11:
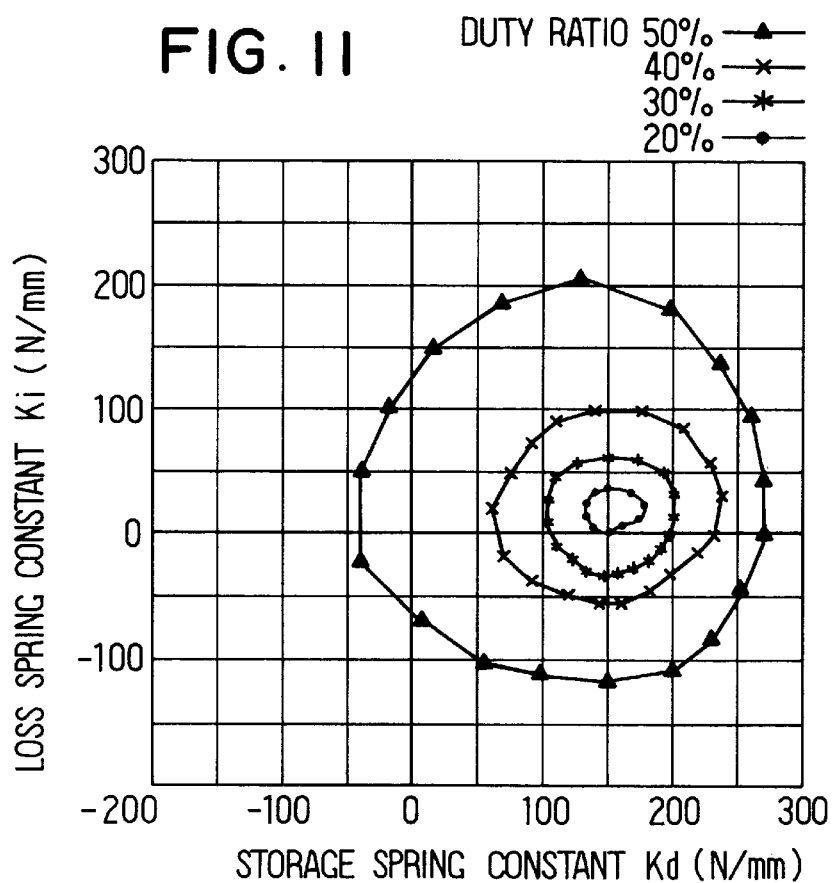
FIG. 11 is a characteristic chart showing control circles under predetermined test conditions (when the control duty ratio is changed) implemented in the engine mount of the electronically controlled engine mount of the fourth embodiment.

In FIG. 11, the diameter of the "control circle" is changed by changing the duty ratio of the driving voltage Vout applied to the VSV 2. Thus, a width of change of the pressure in the air chamber B of the engine mount 4' shown in FIG. 7 may be changed by thus changing the duty ratio. In FIG. 11, the duty ratio is changed from 50% to 20%. The diameter of the "control circle" is maximized when the duty ratio is 50%. Although the diameter of the "control circle" may be changed by giving a duty ratio larger than 50%, the width of change of the pressure of the air chamber B becomes the largest and the diameter of the "control circle" is maximized when the duty ratio is 50%.

As it is apparent from FIG. 11, the V-ACM control characteristics may be controlled with respect to a predetermined frequency by changing the delay time Dq (phase angle) of the driving voltage Vout applied to the VSV 2 and the duty ratio 'Duty'.

In general, the limit of the frequency which allows a valid width of change of pressure of the vacuum chamber of the V-ACM (the air chamber B of the engine mount 4' shown in FIG. 7) to be obtained is up to around 50 Hz and is effective in reducing the vibration during idling. Accordingly, the V-ACM is driven and controlled as follows.

During Idling: The VSV 2 is turned ON/OFF interlocking with the vibrations due to explosions in the engine to switch atmospheric pressure and negative pressure and to control the pressure in the air chamber B to change the V-ACM control characteristics.

During Non-Idling: The VSV 2 is turned OFF to apply negative pressure always to the air chamber B of the engine mount 4' to cause the diaphragm 25 to adhere to the partition 24. The engine vibration in the low frequency band may be reduced by the liquid column effect of the orifice passage Z which communicates the main fluid chamber X and the sub-fluid chamber Y.

Next, a method for driving and controlling the VSV 2 will be explained.

Figure 12:
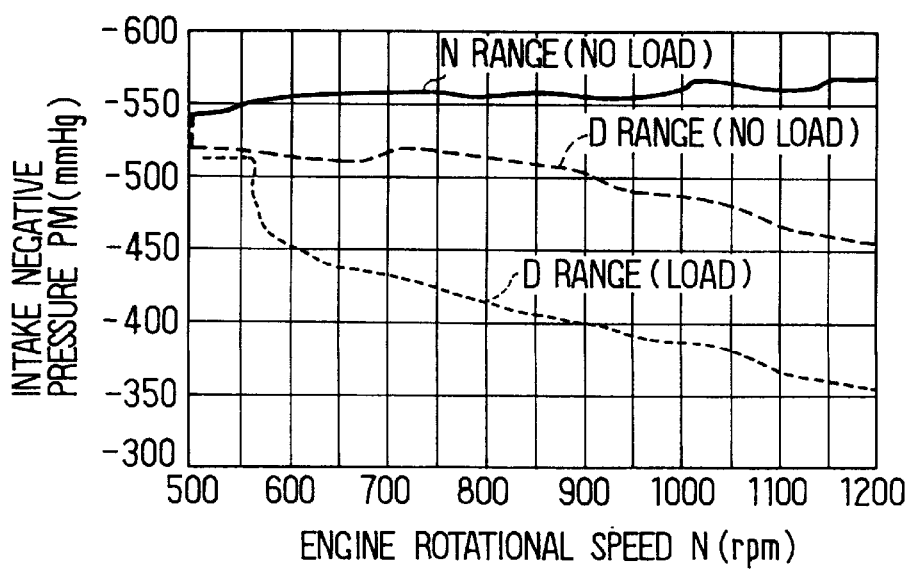
FIG. 12 is a graph showing a relationship between engine load and negative pressure of an intake pipe with respect to the engine mount of the electronically controlled engine mount of the fourth embodiment.

FIG. 12 is graph showing that negative pressure of the intake pipe largely changes depending on the operating condition of the engine in the idle speed range. FIG. 12 shows their relationship when the engine speed N [rpm] is represented by the horizontal axis and the absolute value of the negative pressure PM [mmHg] of the intake pipe is represented by the vertical axis by using N-range (no load), D-range (no-load) and D-range (loaded: headlight ON, rear defogger ON and air-conditioner ON) as parameters.

Figure 13:
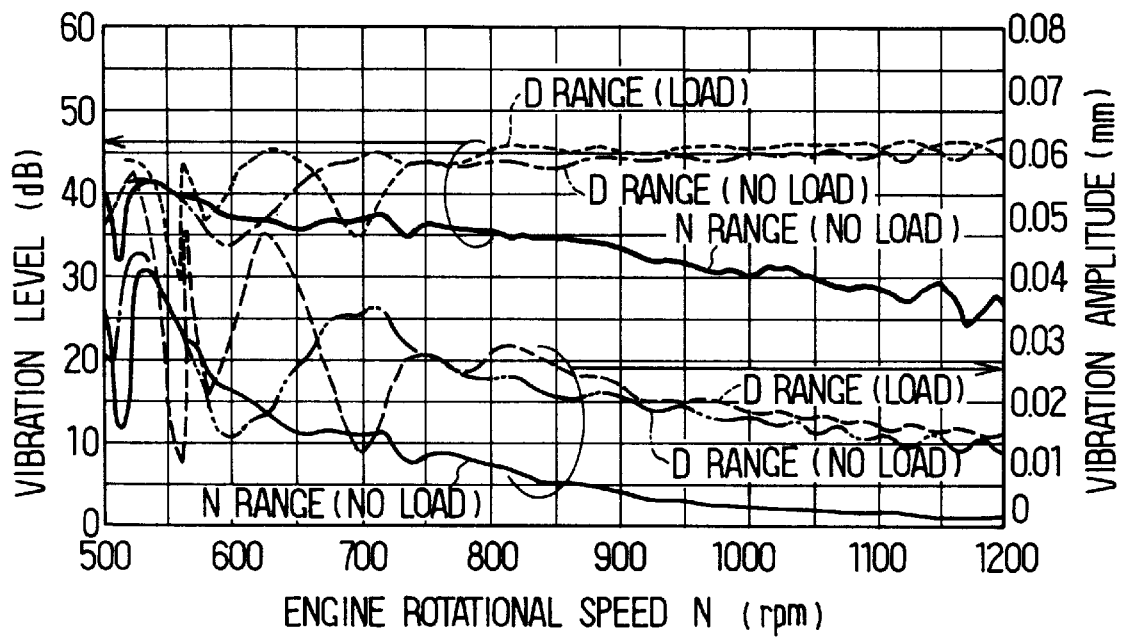
FIG. 13 is a graph showing a relationship among engine load, negative pressure of an intake pipe and amplitude of vibration with respect to the engine mount of the fourth embodiment.

FIG. 13 is a graph showing that vibration (vibration level and amplitude of vibration) of the engine largely changes depending on the operating condition of the engine. Similarly to FIG. 12, the engine speed N [rpm] is represented by the horizontal axis, the vibration level (vibration acceleration) dB is represented by the left vertical axis and the amplitude of vibration is represented by the right vertical axis to show the primary vibrations due to explosions in the engine in the vertical direction at the rear mount region. In general, the greater the engine load, the greater the vibration level and the amplitude of vibration becomes.

Figure 14:
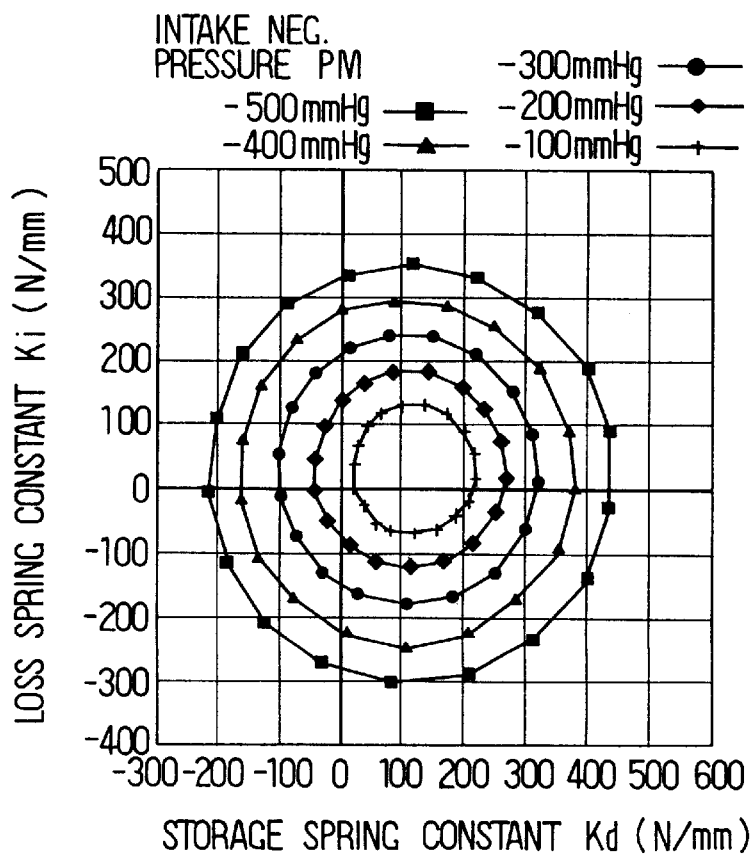
FIG. 14 is a graph showing control circles under predetermined test conditions (when the negative pressure of the intake pipe is changed) exhibited by the electronically controlled engine mount of the fourth embodiment.

FIG. 14 shows that when the width of change of negative pressure of the air chamber B of the engine mount 4" is changed from 500 mmHg to 100 mmHg per 100 mmHg, the diameter of the "control circle" decreases proportionally.

Figures 15, 17A, 17B:
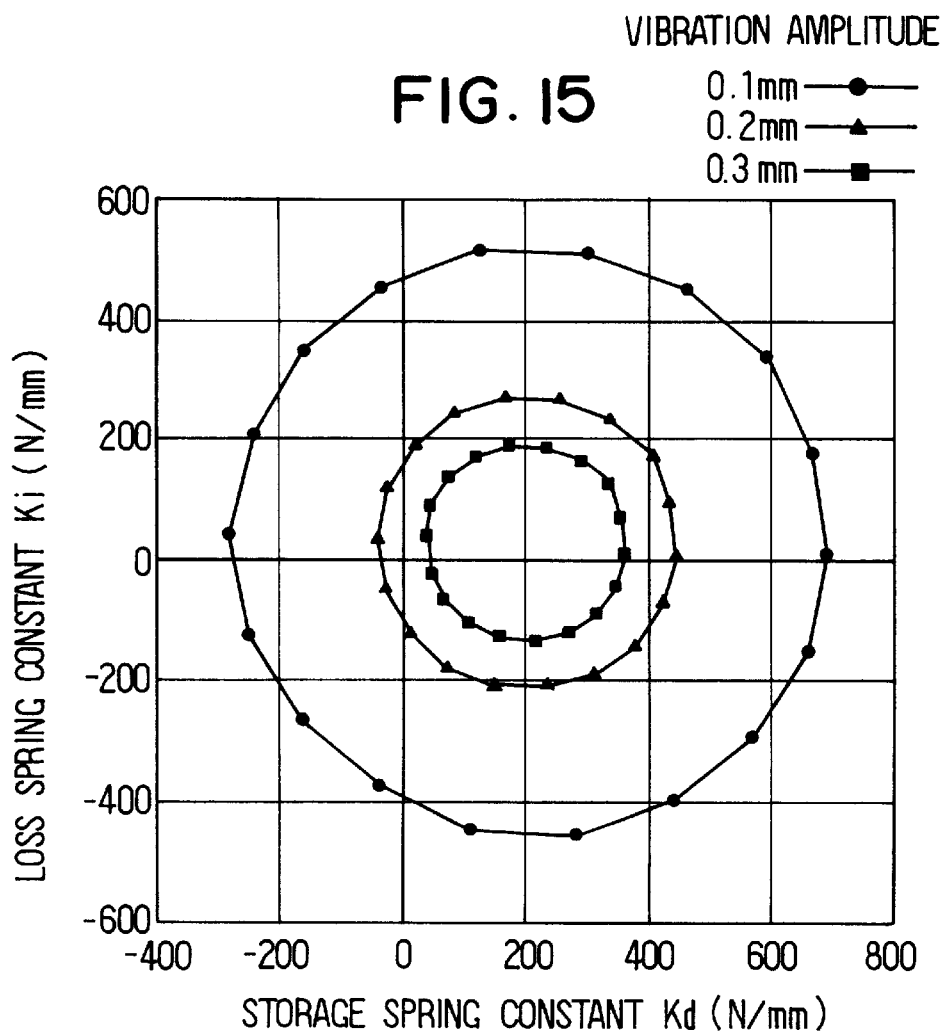
FIG. 15 is a graph showing control circles under predetermined test conditions (when the amplitude of vibration is changed) exhibited by the engine mount of the fourth embodiment.
FIGS. 17A and 17B are maps used in FIG. 16.

FIG. 15 shows that when the amplitude of the vibration input to the engine mount 4" (corresponds to the amplitude of vibration of the engine) is changed from ±0.1 mm to ±0.2 mm and to ±0.3 mm, the diameter of the "control circle" decreases from 1 to ½ and to ⅓, respectively.

Here, the variation caused by the negative pressure of the intake pipe PM or the engine load of the amplitude of vibration of the engine (operating state of the engine) may become an unexpected disturbance to the V-ACM described above. That is, the width of change of the negative pressure of the air chamber B of the engine mount 4" is in the proportional relationship with the diameter of the "control circle" as shown in FIG. 14 and the amplitude of vibration of the engine is in an inversely proportional relationship with the diameter of the "control circle" as shown in FIG. 15. Therefore, if the engine load or its substitute value in the engine operating state can be known, the desired V-ACM control characteristics may be realized by applying correction to the values of the map described above.

Figure 16:
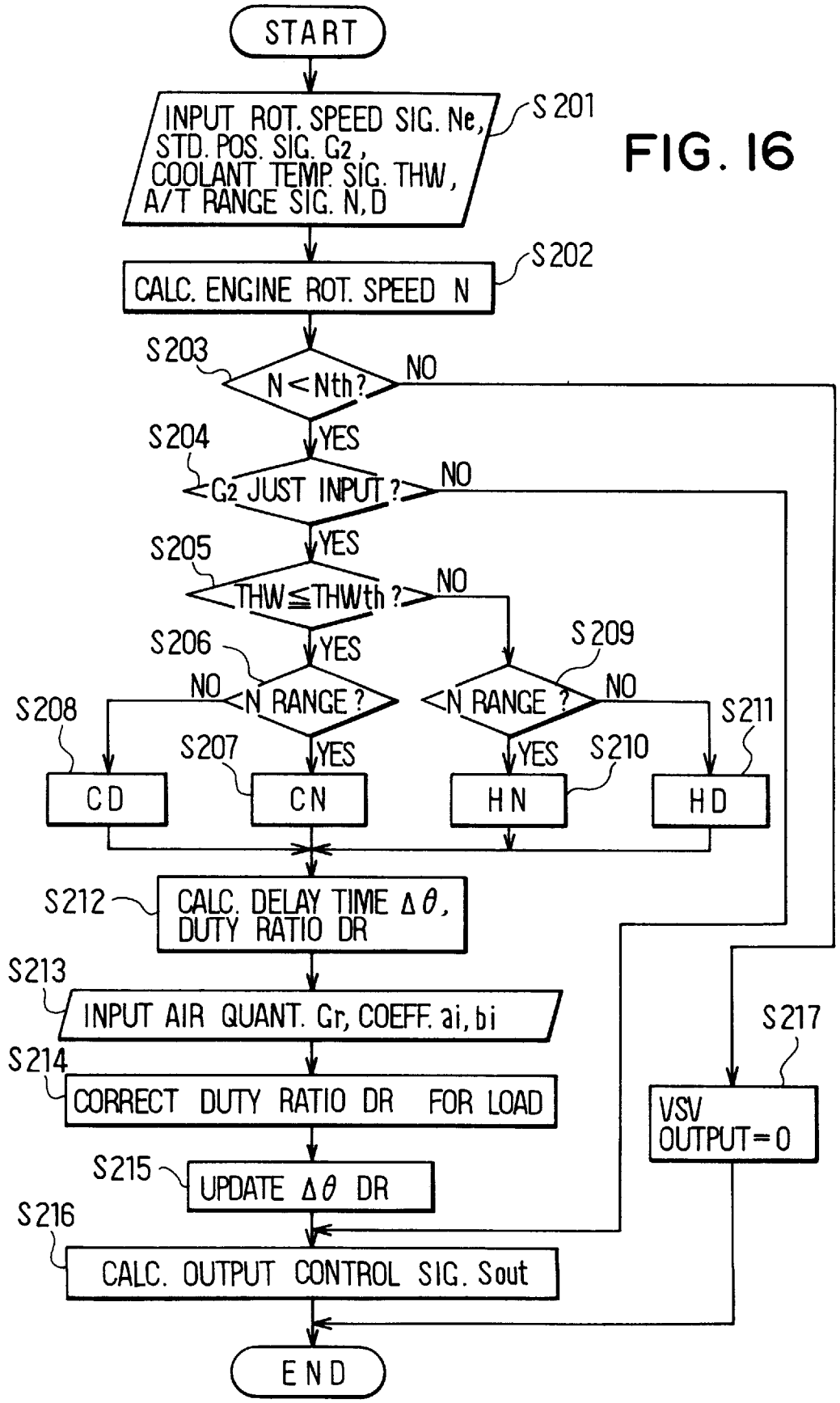
FIG. 16 is a flowchart showing a processing procedure of a CPU within an ECU used in the electronically controlled engine mount of the fourth embodiment.

FIG. 16 is a flowchart showing a processing procedure in executing the opposite-phase control (control for reducing vibration) of the CPU 31 within the ECU 30 used in the electronically controlled engine mount according to the fourth embodiment of the present invention. It is noted that this routine is executed at regular intervals.

At first, the rotational angle signal Ne from the rotational angle sensor 7, the reference position signal G2 from the reference position sensor 8, the cooling water temperature signal THW from the water temperature sensor 86 and the A/T range signal N and D are input in Step 201. Next, in Step 202, the current engine speed N is calculated from the rotational angle signal Ne. Then, in Step 203, it is determined whether the engine speed N is less than a preset engine speed Nth or not. If the condition of determination in Step 203 is met, it is determined if it is the time right after when the reference position signal G2 has been input or not in Step 204. When the condition in Step 204 is met and it is the time right after when the reference position signal G2 has been input, it is determined whether the cooling water temperature signal THW is less than a preset cooling water temperature THWth or not in Step 205.

When the condition in Step 205 is met and it is the cooling time, it is determined whether the A/T range signal indicates N-range or not in-Step 206. When the condition in Step 206 is met, a CN (Cool-Neutral) mode is set in Step 207 and when the condition in Step 206 is not met and the A/T range signal indicates D-range, a CD (cool-Drive) mode is set in Step 208, respectively. When the condition in Step 205 is not met and it is warming-up time, it is then determined whether the A/T range signal indicates N-range or not in Step 209. When the condition in Step 209 is met, a HN (Hot-Neutral) mode is set in step 210 and when the condition in Step 209 is not met and the A/T range signal indicates D-range, a HD (Hot-Drive) mode is set.

Then, in Step 212, the delay time Dq and the basic duty ratio 'Duty' of the VSV 2 in each of the modes set in Steps 208, 207, 210 and 211 are calculated from the engine speed N in accordance to the map (not shown) stored in the ROM 41. It is noted that this map has been prepared such that vibration at a measuring point (e.g., position at a steering wheel of the vehicle) is minimized per engine speed N beforehand by experiments conducted using actual vehicles and the like. Next, a quantity of air Gr [g/20 rev] per 20 revolutions of the engine, a constant of proportionality ai and a constant bi are input in Step 213. Then, the load correction with respect to the duty ratio 'Duty' is executed in Step 214.

Now, one example of the correction based on an output value from the airflow meter 82 will be described. When the aforementioned basic duty ratio 'Duty' of the VSV 2 read from the map is denoted by Di, the duty ratio after the correction is denoted by DDi and a load correction coefficient is Cfi, the correction is made as expressed by the following Equation (2):

$$DDi = Cfi \cdot Di \tag{2}$$

where
$Cfi = Gr \cdot ai + bi$
$Gr = G/(N/60) \cdot 20 = 1200 \cdot G/N$

Gr is a quantity of air per 20 revolutions of the engine [g/20 rev], ai is a constant of proportionality, bi is a constant, G is an instantaneous quantity of air flow [g/sec] and N is an engine speed [rpm].

It is noted that the proportional constant ai and the constant bi are mapped per every 50 rpm with respect to the engine speed N [rpm] as shown in FIG. 17A and the instantaneous quantity of air flow g is mapped with respect to the output value QA [V] of the airflow meter 82, respectively as shown in FIG. 17B. Values between them may be obtained by linear interpolation.

In Step 215, Dq and the duty ratio 'Duty' which have been stored in the RAM 40 are updated to newly calculated values (duty ratio DDi after the correction). Then, in consideration of the delay time Dq and the duty ratio 'Duty' of the VSV 2, a value of the control signal Sout at this time is calculated to output to the actuator driving circuit 43 in Step 216, thus ending this routine.

When the condition in Step 204 is not met and it is not the time right after when the reference position signal G2 has been input on the other hand, Steps 205 through 215 are skipped and the process of calculating and outputting the value of the control signal Sout is executed in consideration of the delay time Dq and the duty ratio 'Duty' of the VSV 2, thus ending this routine. That is, the delay time Dq and the duty ratio 'Duty' of the VSV 2 are updated to the optimum values every time when the reference position signal G2 is input.

When the condition in Step 203 is not met, the duty ratio 'Duty' of the VSV 2 is assumed to be 0% (OFF) in Step 217 and only the negative pressure of the intake pipe is introduced to the air chamber B, thus ending this routine.

Based on the control signal Sout thus prepared, the driving voltage Vout of the rectangular wave is output to the coil 2a of the VSV 2 from the actuator driving circuit 43 and the VSV 2 is turned ON/OFF synchronously with the vibration of the engine to change the pressure in the air chamber B as desired.

According to the electronically controlled engine mount of the fourth embodiment, the pressure in the air chamber B of the engine mount 4" to which the vibration from the engine 10' is input is adequately controlled synchronously with the vibration, so that the vibration transmission characteristics (e.g., dynamic spring constant and damping coefficient) of the engine mount 4' may be optimized and the transmission of the engine vibration may be reduced steadily.

Thus, the control means which is implemented by the ECU 30 in the electronically controlled engine mount of the fourth embodiment corrects the quantity of control for the VSV 2 as the pressure switching means based on the engine load.

Accordingly, the driving voltage Vout as the quantity of control to the VSV 2 is corrected based on the operating state which is set by the engine load such as the electric load to the engine 10'. Because the air chamber B of the engine mount 4" which supports the engine 10' is thus adequately controlled synchronously with the engine load, the vibration transmission characteristics of the engine mount 4' may be optimized and the transmission of the engine vibration may be reduced steadily.

Further, the electronically controlled engine mount of the present embodiment also includes the correction means which is achieved by the ECU 30 for correcting the pressure within the air chamber B such that the engine mount 4" has desired vibration transmission characteristics corresponding to the change of the negative pressure of the intake pipe PM based on the operating condition of the engine 10'.

That is, as shown in the (Kd–Ki) plane in FIG. 14, the degree of the negative pressure of the intake pipe PM and the size of the diameter of the "control circle" may be changed in the proportional relationship. Therefore, the engine mount 4" can obtain the desired vibration transmission characteristics by adequately correcting the pressure within the air chamber B of the engine mount 4".

The electronically controlled engine mount of the present embodiment also includes the correction means which is achieved by the ECU 30 for correcting the pressure within the air chamber B such that the engine mount 4" has desired vibration transmission characteristics corresponding to the change of input vibration based on the operating condition of the engine 10'.

That is, as shown in the (Kd–Ki) plane in FIG. 15, the degree of the amplitude of vibration which corresponds to the input vibration and the size of the diameter of the "control circle" may be changed in an inversely proportional relationship. Therefore, the engine mount 4" can obtain the desired vibration transmission characteristics by adequately correcting the pressure within the air chamber B of the engine mount 4".

The correction means implemented by the ECU 30 of the electronically controlled engine mount of the fourth embodiment corrects by using the output value from the airflow meter 82 or a value calculated based on its output value. The provision of the airflow meter 82 as in the fourth embodiment allows the correction to be readily calculated by taking the output value into the ECU 30 and the engine mount 4", can obtain the desired vibration transmission characteristics by optimizing the pressure within the air chamber B.

Still more, the engine mount 4" takes out the atmospheric pressure to be introduced to the air chamber B from the part of the intake pipe 3 between the airflow meter 82 and the throttle valve 83 which are disposed therein. Because no outside air is taken as the atmospheric pressure, the disturbance of the A/F (air-fuel ratio) may be eliminated and an air intake sound from the VSV 2 may be reduced.

The duty ratio of the driving voltage Vout to the VSV 2 has been corrected by using the quantity of intake air signal QA from the airflow meter 82 in the embodiment described above; however, the present invention is not so limited. That is, if a speed density system in which supply and injection of fuel to the engine is controlled based on intake pressure detected by an intake pressure sensor 89 disposed on part of the surge tank (intake pipe 3) and engine speed at that moment is used, the duty ratio of the driving voltage Vout to the VSV 2 may be corrected by using the intake pressure signal PM.

In such an electronically controlled engine mount, the correction means which is implemented by the ECU 30 corrects by using the output value from the intake pressure sensor or a value calculated based on its output value. The provision of the intake pressure sensor allows the correction to be readily calculated by taking the output value into the ECU 30 and the engine mount 4" can obtain the desired vibration transmission characteristics by optimizing the pressure within the air chamber B.

[Fifth Embodiment]

FIG. 18 is a schematic drawing showing a structure around an engine to which an electronically controlled engine mount of a fifth embodiment of the present invention has been applied. It is noted that components in the Figure which are the same or corresponding components as those in the first embodiment shown in FIG. 1 and in the fourth embodiment shown in FIG. 9 will be denoted by the same reference numerals and symbols and their explanation will be omitted here.

The electronically controlled engine mount of the present embodiment also includes the engine mount 4' and the peripheral devices thereof identical to those in the second embodiment shown in FIG. 7 and their explanation will be also omitted here. It is noted that the VSV 2 connected to the air chamber B of the engine mount 4' shown in FIG. 7 is controlled in ON/OFF states based on the driving voltage Vout from the ECU 30, introducing atmospheric pressure when it is ON and negative pressure when it is OFF also in the present embodiment. That is, the pressure within the air chamber B is switched to the negative pressure or the atmospheric pressure with the timing reversal from the driving voltage Vout shown in FIG. 4D in the first embodiment in order to reduce power consumption.

The fifth embodiment shown in FIG. 18 is different from the first embodiment shown in FIG. 1 in that the water temperature sensor 86 is provided on the cylinder housing of the engine 10 similarly to the fourth embodiment described above and that the cooling water temperature signal THW concerning temperature of the cooling water from the water temperature sensor 86, a neutral safety switch signal NSW from the A/T range SW (switch) 87 indicating that the shift position of the A/T (automatic transmission) is in an N (neutral range) or D (drive range) and an air-conditioner signal A/C from the air-conditioner SW (switch) 88 are input to the ECU 30.

Figure 19:
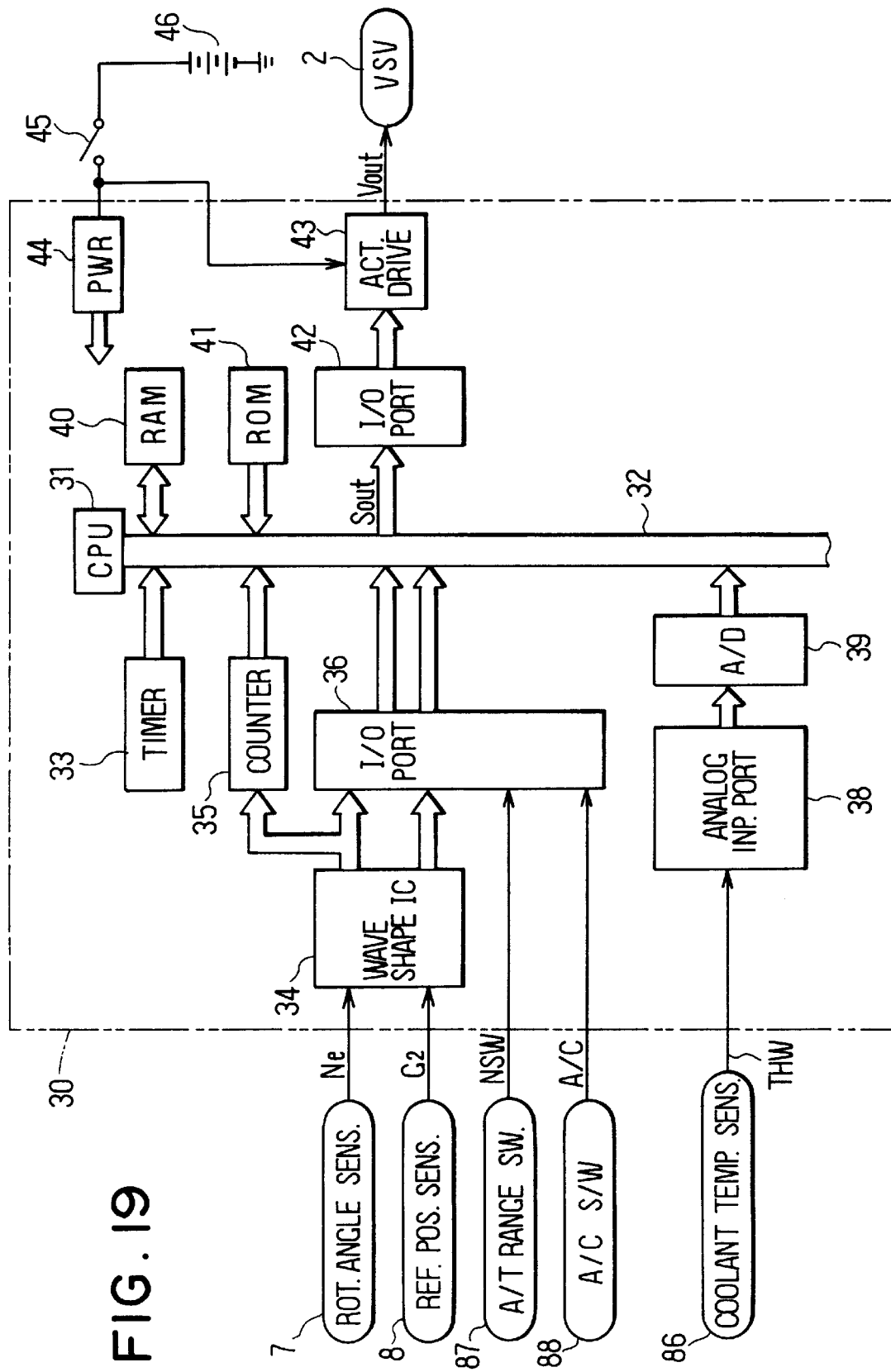
FIG. 19 is a block diagram showing an electrical structure of the electronically controlled engine mount according to the fifth embodiment.

Therefore, while the electrical structure of the electronically controlled engine mount of the present embodiment is almost the same as that of the first embodiment shown in the block diagram of FIG. 3, only the signals input to the ECU 30 are different as shown in FIG. 19. That is, as the signals input to the ECU 30, the cooling water temperature signal THW from the water temperature sensor 86, the neutral safety switch signal NSW from the A/T range SW 87 of the A/T (automatic transmission) and the air-conditioner signal A/C from the air-conditioner SW 88 are added, besides the rotational angle signal Ne from the rotational angle sensor 7 and the reference position signal G2 from the reference position sensor 8. It is noted that no acceleration sensor is used in the fifth embodiment.

Figure 20:
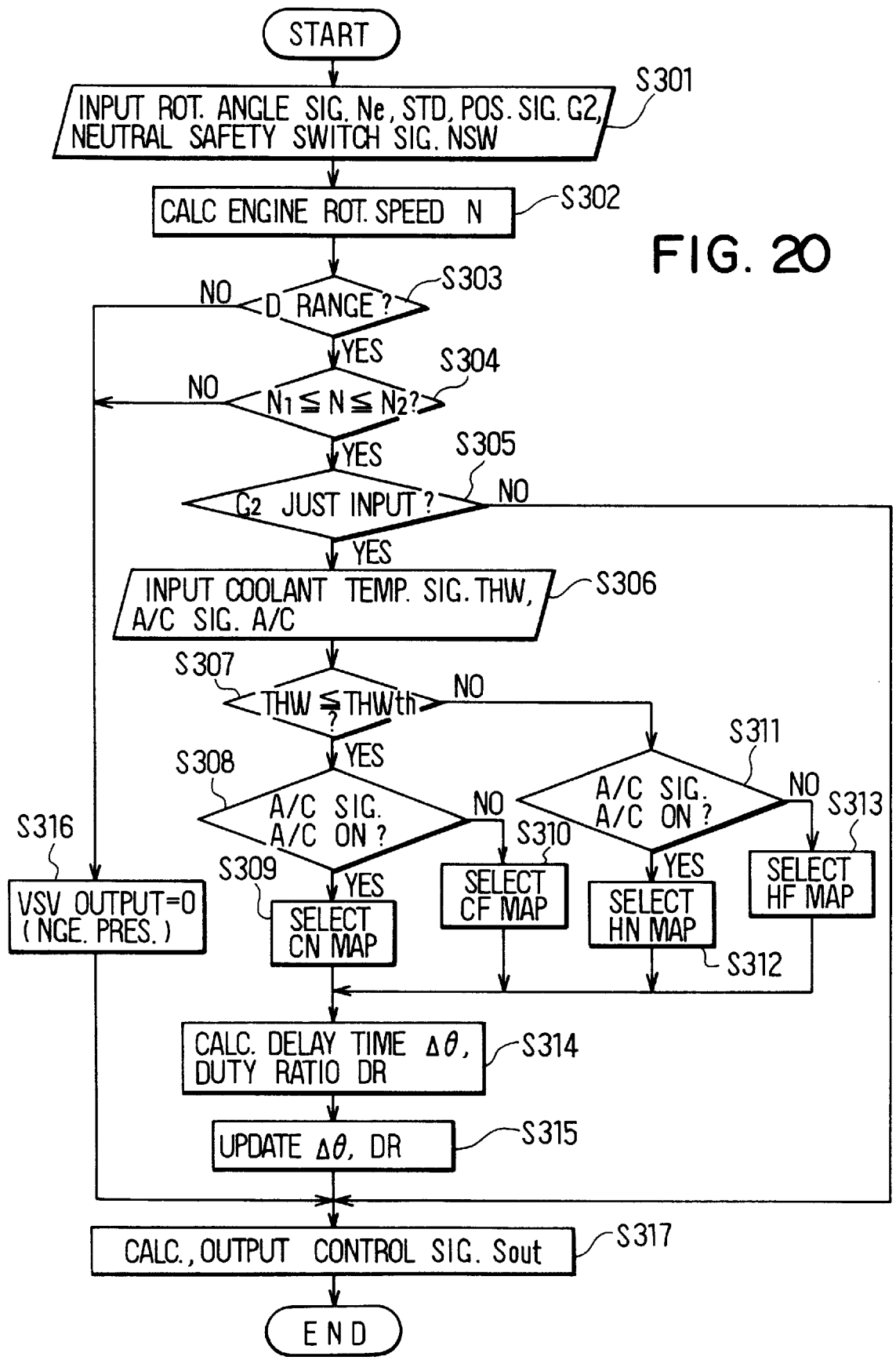
FIG. 20 is a flowchart showing a processing procedure of a CPU within an ECU used in the electronically controlled engine mount of the fifth embodiment.

FIG. 20 is a flowchart showing a processing procedure for executing the opposed-phase control (vibration reducing control) of the CPU within the ECU used in the electronically controlled engine mount of the fifth embodiment and this will be explained with reference to maps in FIGS. 21A and 21B. This routine is executed per every predetermined time. FIG. 21A is a map based on the cooling water temperature signal THW and the air-conditioner signal A/C and FIG. 21B shows contents of a map for calculating the delay time Dq and the duty ratio 'Duty' from the engine speed N. It is noted that in FIG. 21B, while the engine speed N is shown in units of 50 rpm, the delay time Dq and duty ratio 'Duty' in between them are calculated by liner interpolation. In FIG. 20, the rotational angle signal Ne from the rotational angle sensor 7, the reference position signal G2 from the reference position sensor 8, the cooling water temperature signal THW from the water temperature sensor 86, the neutral safety switch signal NSW from the A/T range SW 87 and the air-conditioner signal A/C from the air-conditioner SW 88 are input in Step 301. Next, the current engine speed N is calculated from the rotational angle signal Ne in Step 302. Step 303 determines whether the neutral safety switch signal NSW is OFF and indicates D-range (includes L, 2nd and R-range) or not. When the condition in Step 303 is met, it is determined whether the engine speed N is more than a first predetermined engine speed Ni which is, for example, 500 rpm, or less than a second predetermined engine speed N2 which is, for example, 1000 rpm, in Step 304. If the condition in Step 304 is met, it is determined that idling drive is done and an idling vibration reducing process is executed in and after Step 305.

Step 305 determines whether it is the time right after when the reference position signal G2 has been input or not. When the condition in Step 305 is met and it is the time right after when the reference position signal G2 has been input, the cooling water temperature signal THW from the water temperature sensor 86 and the air-conditioner signal A/C from the air-conditioner SW 88 are input in Step 306. Next, it is determined whether the cooling water temperature signal THW is less than a preset temperature of cooling water temperature signal THWth or not in Step 307. When the condition in Step 307 is met and it is the cooling time, it is determined whether the air-conditioner signal A/C is ON or not in step 308. When the condition in Step 308 is met and the air-conditioner is ON, a CN map in cooling and when the air-conditioner is ON not shown and stored in the ROM 41 is selected in Step 310 (see FIG. 21A).

On the other hand, when the condition in Step 308 is not met and it is the warming-up time, it is determined in Step 311 whether the air-conditioner signal A/C is ON or not. When the condition in Step 311 is met and the air-conditioner is ON, an HN map in warming and when the air-conditioner is ON not shown and stored within the ROM 41 is selected in Step 312 (see FIG. 21A). When the condition in Step 311 is not met and the air-conditioner is OFF, an HF map in warming and when the air-conditioner is OFF not shown and stored in the ROM 41 is selected in Step 313 (see FIG. 21a). It is noted that these maps have been prepared in advance by experiments by actual vehicles such that vibration at a measuring point (e.g., position at the steering wheel of the vehicle) is minimized relative to engine speed.

After selecting each map corresponding to the cooling water temperature signal THW and the air-conditioner signal A/C in Steps 309, 310, 312 or 313, the delay time Dq as a control phase and the duty ratio 'Duty' are calculated based on the engine speed N in accordance with the selected map shown in FIG. 21B in Step 314. Then, in Step 315, the delay time Dq and the duty ratio 'Duty' which have been stored within the RAM 40 are updated to new values calculated in Step 314. Here, if the condition in Step 305 is not met and it is not the time right after when the reference position signal G2 has been input, Steps 306 through 315 are skipped and the delay time Dq and the duty ratio 'Duty' are not updated.

When the condition in Step 303 is not met and the neutral safety switch signal NSW is ON, indicating N-range (including P-range), or when the condition in Step 304 is not met and it is on the way of starting during which the engine speed N is, for example, less than 500 rpm or when it is non-idling drive time when the engine speed N exceeds 1000 rpm on the other hand, the routine proceeds to Step 316. In Step 316, a VSV output to the VSV 2 is zeroed [duty ratio 'Duty' is 0% (OFF)] in order to vacuum the pressure P within the air chamber B of the engine mount 4'.

After processing in Step 315 or in Step 316, the control signal Sout to the VSV 2 is calculated and is output considering the delay time Dq and the duty ratio 'Duty' within the RAM 40. Then, this routine is finished. That is, the delay time Dq and the duty ratio 'Duty' are updated to the optimum values every time when the reference position signal G2 is input.

Based on the control signal Sout thus prepared, the driving voltage Vout of the rectangular wave is output to the coil 2a of the VSV 2 from the actuator driving circuit 43 and the VSV 2 is turned ON/OFF interlocking with the vibration of the engine to change the pressure P within the air chamber B of the engine mount 4' as desired.

Figure 22:
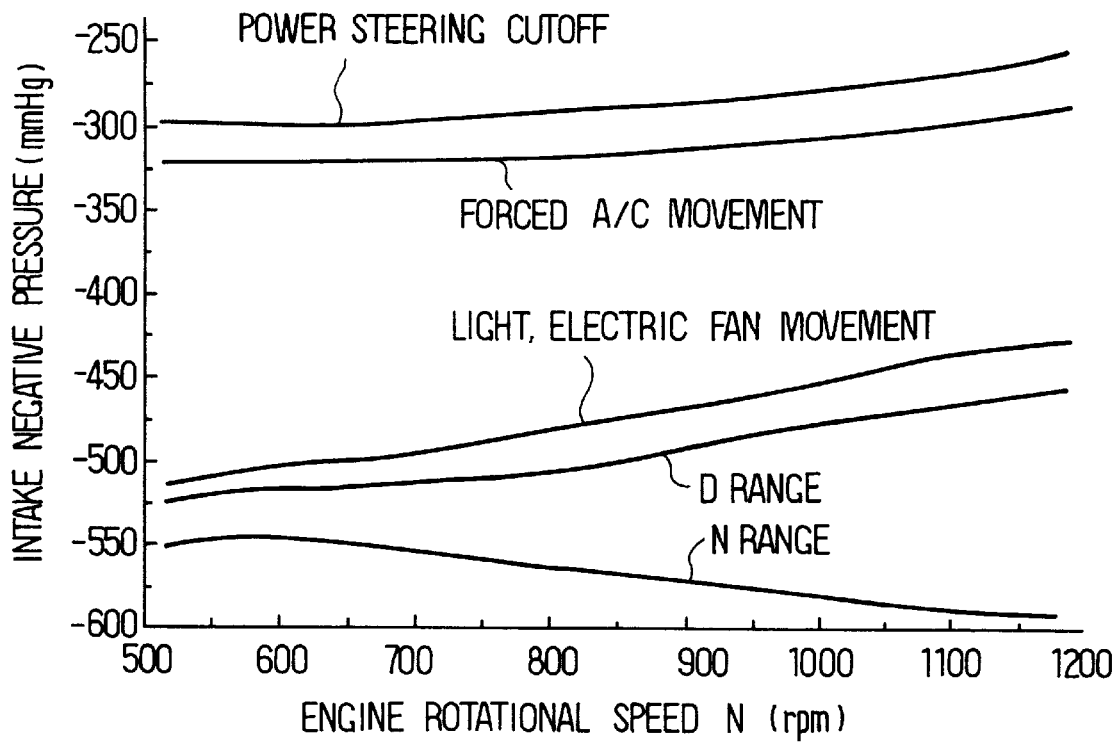
FIG. 22 is a graph showing changes of intake negative pressure with respect to engine speed when engine load in the electronically controlled engine mount of the fifth embodiment is changed.

FIG. 22 is a characteristic chart showing change of intake negative pressure with respect to the engine speed which is the basis for considering ON/OFF control of the air-conditioner as the engine load in the system of the present embodiment.

As is apparent from the characteristic chart in FIG. 22, the change of the intake negative pressure as the engine load with respect to the engine speed N is specifically larger than the change between the N-range and the D-range when the air-conditioner is actuated. Therefore, the above-mentioned control allows the optimum control considering the influence of ON/OFF control of the air-conditioner as the engine load which differs depending on the engine operating state to be executed.

Thus, the control means which is implemented by the ECU 30 of the electronically controlled engine mount of the present embodiment switches the maps for controlling the VSV 2 in correspondence with the ON/OFF control of the air-conditioner. Therefore, the optimum control considering the influence of the ON/OFF control of the air-conditioner as the engine load which differs depending on the engine operating state may be executed and the idling vibration may be reduced regardless of the engine operating state.

Further, when the transmission range of the A/T whose vibration level is good is in the N-range (including the P-range), the idling vibration reducing control is not executed. The idling vibration reducing control is executed only in the D-range (including L-, 2nd- and R-ranges) in which a vibration level is bad and which is used frequently. Therefore, the idling vibration during driving which the driver is most concerned with may be improved and a number of times of operation of the VSV 50 and the diaphragm 25 may be reduced, thus improving the durability and reliability.

In the idling vibration reducing control in the fifth embodiment shown in FIGS. 18 and 19, a speed sensor may be added to provide a signal to the ECU 30 and to specify the idling drive time further by taking the degree of the speed signal into consideration. That is, at this time, the speed signal from the speed sensor is also input in Step 301 in FIG. 20. The speed found from the speed sensor is compared with a preset speed for determining the idling drive time, e.g., 5 km/h, before the determination in Step 303. If the speed is less than 5 km/h, it is assumed to be the idling drive time and the routine is shifted to Step 303 in FIG. 20 to execute the same process thereafter.

Thus, the active vibration reducing control interlocked with the vibration of the engine 10 is executed only during the idling drive time (when the speed is less than 5 km/h and the engine speed is 500 rpm to 1000 rpm). That is, ON/OFF of the VSV 50 is controlled by the optimum delay time Dq and the optimum duty ratio 'Duty' as a predetermined phase difference which changes corresponding to the engine speed N in the same cycle with respect to the primary vibrations due to explosions in the engine 10 to switch negative pressure and atmospheric pressure to optimally control the pressure P within the air chamber B and to reduce the idling vibration.

Thus, the control means which is achieved by the ECU 30 of the electronically controlled engine mount of the present embodiment controls the pressure P within the air chamber B of the engine mount 4' by driving the VSV 2 corresponding to the vibration of explosion in the engine 10 only during the idling drive time. That is, because the VSV 2 and the diaphragm 25 which includes the air chamber B of the engine mount 4' are activated only during the idling drive time, the number of activation times is reduced, improving the durability and the reliability of the system as a result.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An electronically controlled engine mount comprising:
   an engine mount disposed between a body of a vehicle and an engine installed in said vehicle and which has a gas chamber in which gas is sealed and whose volume is changed by vibration input from said body and said engine;
   pressure switching means for switching pressure within said gas chamber to at least one of a predetermined negative pressure supplied from said engine and atmospheric pressure; and
   control means for changing vibration transmission characteristics of said engine mount by driving said pressure switching means to alternately introduce the negative pressure and the atmospheric pressure into said gas chamber in correspondence to explosive vibrations of said engine when said engine is in a predetermined operating state in which a frequency of said explosive vibrations is lower than a predetermined frequency, and to introduce one of solely the negative pressure and solely the atmospheric pressure into said gas chamber when said engine is outside said predetermined operating state.

2. The mount of claim 1, wherein said engine mount comprises:

a main fluid chamber, separated from said gas chamber by an elastic membrane, into which non-compressive fluid is sealed and whose volume is changed by vibration input from said body and said engine; and a sub-fluid chamber, separated from said gas chamber by a partition, into which said non-compressive fluid is sealed, said sub-fluid chamber being in communication with said main fluid chamber via a communication hole passing through part of said partition and having a variable volume.

3. The mount of claim 2, further comprising:

interrupting means in a passage of said communication hole to selectively put said passage of said communication hole into a communication state and a non-communication state;

wherein said control means is for controlling said interrupting means corresponding to the switching of said pressure switching means.

4. The mount of claim 2, further comprising a plurality of types of multiple projections on at least one of said elastic membrane and a member facing said elastic membrane.

5. The amount of claim 1, further comprising:

signal generating means for generating a signal having a predetermined phase difference which changes corresponding to a speed of said engine in a same cycle with respect to primary vibrations due to explosions in said engine; and wherein said control means is for controlling said pressure switching means responsive to the signal generated by said signal generating means when the frequency of said explosive vibrations is lower than the predetermined frequency.

6. The mount of claim 5, further comprising:

rotational angle detecting means for generating a rotational angle signal indicative of a rotational angle of said engine; and reference position signal detecting means for generating a reference position signal indicative of a reference position of a crank angle of said engine;

wherein said signal generating means is for generating a signal having a predetermined phase difference which changes corresponding to a speed of said engine in the same cycle with respect to the primary vibrations due to explosions in said engine based on said rotational angle signal and said reference position signal.

7. The mount of claim 5, wherein the primary vibrations due to explosions in said engine are controlled by feeding back a signal detected by using an acceleration sensor attached at least one place among said body, said engine and said engine mount.

8. The mount of claim 1, wherein said control means is for driving and controlling said pressure switching means to change periods of introduction of the negative pressure and the atmospheric pressure with respect to a duty ratio based on parameters related to explosive vibrations of said engine when the frequency of said explosive vibrations is lower than the predetermined frequency.

9. The mount of claim 1, wherein said control means is for correcting switching control amount to said pressure switching means based on a load of said engine when the frequency of said explosive vibrations is lower than the predetermined frequency.

10. The mount of claim 1, further comprising correction means for correcting pressure within said gas chamber such that said engine mount has predetermined vibration transmission characteristics in correspondence to a change of negative pressure of an intake pipe of said engine based on an operating state of said engine.

11. The mount of claim 1, further comprising correction means for correcting pressure within said gas chamber such that said engine mount has predetermined vibration transmission characteristics in correspondence to a change of input vibration based on an operating state of said engine.

12. The mount of claim 11, wherein said correction means is for correcting the pressure by using a value representative of an output from an airflow meter.

13. The mount of claim 11, wherein said correction means is for correcting the pressure by using a value representative of an output from an intake pressure sensor.

14. The mount of claim 1, wherein said control means is for switching control maps for said pressure switching means in correspondence to an ON/OFF state of an air-conditioner installed in said vehicle.

15. The mount of claim 1, wherein said engine mount is for taking out atmospheric pressure to be introduced to said gas chamber from part of an intake pipe between an airflow meter and a throttle valve provided therein in said engine.

16. The mount of claim 1, wherein said control means is for controlling pressure within said gas chamber by driving said pressure switching means corresponding to explosive vibrations of said engine only when said engine is in at idle.

17. The mount of claim 1, further comprising:

idle running state detecting means for providing a signal to said control means representative of an idle running state of said engine;

wherein said control means is further for driving said pressure switching means to switch pressure within said gas chamber to negative pressure when an idle running state is not detected by said idle running state detecting means.

18. The mount of claim 17, wherein said idle running state detecting means is for detecting an idle running state of said engine when a rotational speed of said engine is not greater than a predetermined speed.

19. The mount of claim 17, wherein said idle running state detecting means is for detecting an idle running state of said engine when a speed of said vehicle is not greater than a predetermined speed.

20. The mount of claim 8, wherein said control means is for collecting the duty ratio based on a load of said engine.

21. An electronically controlled engine mount comprising:

an engine mount including an elastic member having at least one operation characteristic that changes with changes in temperature, and disposed between a body of a vehicle and an engine installed in said vehicle for changing its vibration transmission characteristics by driving an actuator;

temperature state detecting means for detecting a temperature state of said engine; and control signal computing means for computing a control signal of said actuator based on the temperature state of said engine detected by said temperature state detecting means and on vibrations input from said engine, and for controlling said actuator based on said control signal.

22. The mount of claim 21, wherein said control signal computing means is for switching a plurality of maps stored in advance based on the temperature state of said engine detected by said temperature state detecting means in computing said control signal.

23. An electronically controlled engine mount comprising:

an engine mount disposed between a body of a vehicle and an engine installed in said vehicle for changing its vibration transmission characteristics by driving an actuator, said engine mount having at least one operation characteristic that is variable with temperature; and signal computing means for computing a control signal of said actuator based on change of said operation characteristic of said engine mount and vibrations input from said engine, and for controlling said actuator based on said control signal, and further comprising means for computing said operation characteristic based on a temperature state of said engine detected by temperature state detecting means.

24. The mount of claim 21, wherein:

the actuator includes a pressure switching valve which alternately introduces a negative pressure and an atmospheric pressure into a gas chamber of said engine mount in response to the control signal only when a frequency of said vibrations input from said engine is lower than a predetermined frequency.

25. The mount of claim 23, wherein:

the actuator includes a pressure switching valve which alternately introduces a negative pressure and an atmospheric pressure into a gas chamber of said engine mount in response to said control signal only when a frequency of said vibrations input from said engine is lower than a predetermined frequency.

26. The mount of claim 23, wherein said operation characteristic comprises an absolute spring constant of said engine mount, whereby engine mount control characteristics are changed in accordance with changes in the absolute spring constant of the engine mount.

27. An electronically controlled engine mount comprising:

an engine mount disposed between a body of a vehicle and an engine installed in said vehicle and which has a gas chamber in which gas is sealed and whose volume is changed by vibration input from said body and said engine;

pressure switching means for switching pressure within said gas chamber to at least one of a predetermined negative pressure supplied from said engine and atmospheric pressure; and control means for changing vibration transmission characteristics of said engine mount by driving said pressure switching means to alternately introduce the negative pressure and the atmospheric pressure into said gas chamber in correspondence to explosive vibrations of said engine when said engine is in a predetermined operating state in which a speed of said engine is lower than a predetermined speed and to introduce one of solely the negative pressure and solely the atmospheric pressure into said gas chamber when said engine is outside said predetermined operating state.

28. The mount of claim 27, wherein said engine mount comprises:

a main fluid chamber, separated from said gas chamber by an elastic membrane, into which non-compressive fluid is sealed and whose volume is change by vibration input from said body and said engine; and a sub-fluid chamber, separated from said gas chamber by a partition, into which said non-compressive fluid is sealed, said sub-fluid chamber being in communication with said main fluid chamber via a communication hole passing through part of said partition and having a variable volume.

29. The mount of claim 27, wherein said control means is for driving and controlling said pressure switching means to change periods of introduction of the negative pressure and the atmospheric pressure with respect to a duty ratio based on parameters related to explosive vibrations of said engine when the frequency of said explosive vibrations is lower than the predetermined frequency.

30. The mount of claim 27, wherein said control means is for correcting switching control amount to said pressure switching means based on a load of said engine when the frequency of said explosive vibrations is lower than the predetermined frequency.

* * * * *